United States Patent [19]

Kimmel et al.

[11] Patent Number: 6,105,053
[45] Date of Patent: Aug. 15, 2000

[54] OPERATING SYSTEM FOR A NON-UNIFORM MEMORY ACCESS MULTIPROCESSOR SYSTEM

[75] Inventors: Jeffrey S. Kimmel, Chapel Hill; Robert A. Alfieri, Apex; Miles A. de Forest, Duraham; William K. McGrath, Raleigh; Michael J. McLeod, Garner; Mark A. O'Connell, Chapel Hill; Guy A. Simpson, Cary, all of N.C.

[73] Assignee: EMC Corporation, Hopkinton, Mass.

[21] Appl. No.: 08/494,357

[22] Filed: Jun. 23, 1995

[51] Int. Cl.[7] .................................................... G06F 9/00
[52] U.S. Cl. ............................................ 709/105; 709/102
[58] Field of Search ................................... 395/672, 676, 395/674, 741, 650; 709/100–108

[56] References Cited

U.S. PATENT DOCUMENTS

| | | |
|---|---|---|
| 5,099,516 | 3/1992 | Durkin et al. . |
| 5,179,702 | 1/1993 | Spix et al. ............................ 395/650 |
| 5,237,673 | 8/1993 | Orbits et al. . |
| 5,241,641 | 8/1993 | Iwasa et al. . |
| 5,261,053 | 11/1993 | Valencia . |
| 5,265,235 | 11/1993 | Sindhu et al. . |
| 5,276,848 | 1/1994 | Gallagher et al. . |
| 5,297,265 | 3/1994 | Frank et al. . |
| 5,317,738 | 5/1994 | Cochcroft et al. ..................... 395/650 |
| 5,379,432 | 1/1995 | Orton et al. . |
| 5,448,732 | 9/1995 | Matsumoto ............................ 395/650 |
| 5,452,452 | 9/1995 | Gaetner et al. ........................ 395/650 |
| 5,515,538 | 5/1996 | Kleiman ................................. 395/733 |
| 5,682,530 | 10/1997 | Shimamura ............................ 709/104 |

OTHER PUBLICATIONS

"Experiences Implementing BIND, A Distributed Name Server for the DARPA Internet", James M. Bloom et al, Conference Proceedings 1986.

"Dynamic Load Balancing in a Distributed System Using a Sender–Initiated Algorithm", Local computer Networks, 1988, 13th Conference, Anna Hac et al.

*Primary Examiner*—Alvin E. Oberley
*Assistant Examiner*—P. Caldwell
*Attorney, Agent, or Firm*—Van Dyke, Gardner, Linn & Burkhart, LLP

[57] ABSTRACT

An operating system for a non-uniform memory access (NUMA) multiprocessor system that utilizes a software abstraction of the NUMA system hardware representing a hierarchical tree structure to maintain the most efficient level of affinity and to maintain balanced processor and memory loads. The hierarchical tree structure includes leaf nodes representing the job processors, a root node representing at least one system resource shared by all the job processors, and a plurality of intermediate level nodes representing resources shared by different combinations of the job processors. The operating system includes a medium term scheduler for monitoring the progress of active thread groups distributed throughout the system and for assisting languishing thread groups, and a plurality of dispatchers each associated with one of the job processors for monitoring the status of the associated job processor and for obtaining thread groups for the associated job processor to execute. The operating system further includes a memory manager for allocating virtual and physical memory using a plurality of memory pools and frame treasuries.

29 Claims, 22 Drawing Sheets

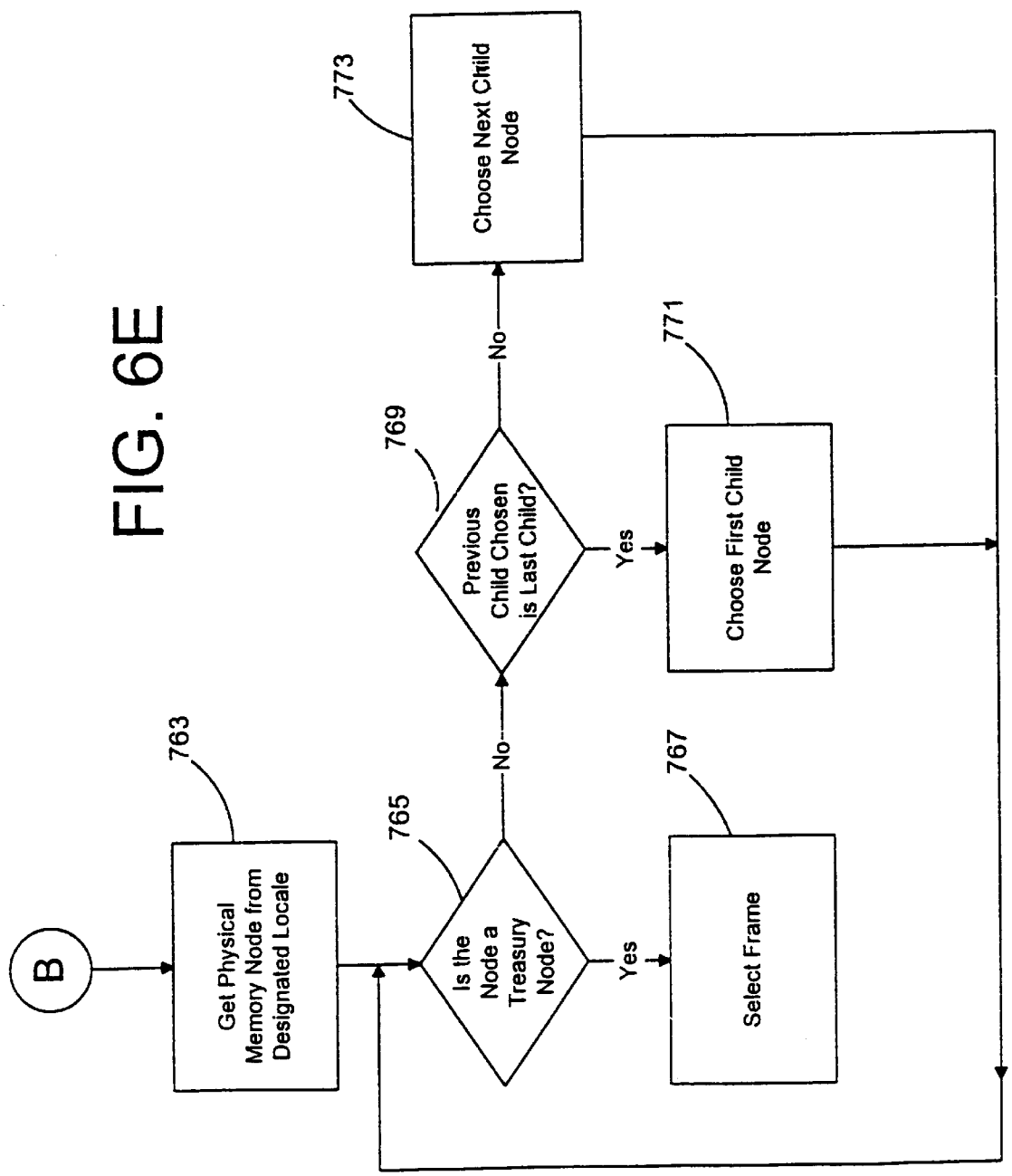

OPERATING SYSTEM FOR A NON-UNIFORM MEMORY ACCESS MULTIPROCESSOR SYSTEM

BACKGROUND OF THE INVENTION

The present invention relates generally to computer operating systems and more particularly to an operating system for a non-uniform memory access (NUMA) multiprocessor system.

Threads are programming constructs that facilitate efficient control of numerous asynchronous tasks. Since they closely map to the underlying hardware, threads provide a popular programming model for applications running on symmetric multiprocessing systems.

Modern multiprocessing systems can have several individual job processors (JPs) sharing processing tasks. Many such systems incorporate caches that are shared by a subset of the system's JPs. One problem with many prior art multiprocessor systems, however, is poor JP and cache affinity when a process executing on the system creates multiple processing threads during its execution. In some prior art systems, each thread is assigned an individual priority and is individually scheduled on a global basis throughout the system. In other prior art systems, individual threads can be affined to individual JPs. When multiple related threads, which tend to access the same data, are distributed across multiple JP groups, an undesirably high level of data swapping in and out of the system caches can occur.

Commmonly assigned U.S. Pat. No. 5,745,778 for an APPARATUS AND METHOD FOR IMPROVED CPU AFFINITY IN A MULTI-PROCESSOR SYSTEM, the disclosure of which is herein incorporated by reference, discloses a method for affining groups of related threads from the same process to a group of JPs to improve secondary cache affinity while improving efficiency of operations among threads in the same group and reducing overhead for operations between groups. The disclosed method further automatically modifies affinity and moves groups of related threads while maintaining local efficiency. To obtain a balanced processor load across the multiprocessor system, the disclosed method periodically performs load balancing by promoting all active thread groups to the highest and most visible level in the system architecture. There exists a need for an operating system having a global scheduling mechanism that may be implemented in a scalable multiprocessor system having a NUMA architecture. Further, there exists a need for a way to abstract a NUMA system so as to manage cost tradeoffs and implement policies and mechanisms that take into account resource access costs while spreading workloads across system resources. Additionally, a need exists for an operating system having a memory manager supporting address transparent memory migration and seamless integration of the various memory resources of a NUMA multiprocessing system.

SUMMARY OF THE INVENTION

Accordingly, the present invention is intended to overcome the above problems. One aspect of the operating system of the present invention is that it provides locality management mechanisms that increase system throughput and maintain close affinity between the processes and the job processors. To achieve this and other advantages, and in accordance with the purpose of the invention as embodied and broadly described herein, the operating system of the present invention includes means for maintaining an abstraction of the hardware architecture of a multiprocessor system. The abstraction represents the physical arrangement of processors and shared resources in the form of a hierarchical tree structure having a plurality of leaf nodes corresponding to the processors and located at the lowest level of the hierarchical tree, a root node corresponding to common resources shared by all of the processors and shared intermediate resources and located at the highest level of the hierarchical tree, and a plurality of intermediate nodes corresponding to the shared intermediate resources and located in at least one intermediate level of the hierarchical tree. Means are provided for establishing a run queue for each node of the hierarchical tree. Each run queue that is associated with a leaf node identifies the active processes or thread groups affined to the associated processor. Each run queue that is associated with one of the remaining nodes identifies the active processes affined to groups of the processors that share the resource associated with the node. Means are further provided for monitoring the activity of the processors and selecting processes queued in the run queues for the processors to execute.

Another aspect of the operating system of the present invention provides a global scheduling mechanism for maintaining a balanced processor load across the system while increasing system throughput. To achieve this and other advantages, the operating system of the present invention includes means for maintaining the hierarchical tree abstraction of the hardware architecture of the multiprocessor system, and means for monitoring the progress of the active processes in the system and for increasing the likelihood that any process that was not progressing will be executed sooner. Yet another aspect of the operating system of the present invention provides global and local scheduling mechanisms that cooperate to ensure that processes do not languish in the system.

To achieve this and other advantages, the operating system of the present invention includes a dispatcher associated with each of the processors for monitoring a run queue of the associated processor, which looks for and obtains processes from the run queues of the other processors for the associated processor to execute, and a medium term scheduler, which monitors the progress of active processes in the system and sets a flag for those processes that are not progressing. When said dispatcher finds a run queue having a plurality of available processes, the dispatcher selects a process having its flag set.

In accordance with another embodiment of the present invention, the above aspect may be achieved by an operating system including a medium term scheduler for monitoring progression of each active process in the system, and for boosting a priority of each active process that has not progressed within a predetermined time period, and at least one dispatcher associated with one of the processors for monitoring a run queue that queues processes to be executed by the associated processor and for selecting the highest priority active process in the run queue for execution by the associated processor.

Still another aspect of the present invention is to provide a dynamic data structure mechanism for determining whether the affinity of a process has been changed and for determining whether to change the home affinity of a process. To achieve this and other advantages, the operating system of the present invention includes means for maintaining the hierarchical tree abstraction of the hardware architecture of the multiprocessor system, and means for establishing a run queue for each node of the hierarchical tree, each run queue that is associated with a leaf node identifying the active processes affined to the associated processor and each run queue that is associated with one of the remaining nodes identifying the active processes affined to groups of the processors that share the resource associated with the node. The abstraction defines one of the levels of the hierarchical tree as a scheduling level and identifying the nodes within the scheduling level as scheduling locales. Each active process or thread group within the multiprocessor system has a home-scheduling locale and a current-scheduling locale, each corresponding to one of the scheduling locales. The home-scheduling locale of a process is the scheduling locale that is the ancestor of the preferred processor for executing the process. The current-scheduling locale of a thread group is the scheduling locale that is the ancestor of the processor that last executed or is currently executing the process.

A further aspect of the present invention is to utilize data structures for allocating physical memory seamlessly in a NUMA system. To achieve this aspect, the operating system of the present invention includes means for maintaining the hierarchical tree abstraction of the hardware architecture of the multiprocessor system. The operating system further includes means for maintaining a frame treasury at each node representing a shared physical memory resource for controlling frame management and allocation of the resource, and for identifying the node common to all the nodes. Associated with treasuries are a high level policy node for allocating frames of physical memory from the frame treasuries for use by at least one of the processors.

Another aspect of the present invention is to utilize multiple independent memory pools for allocating virtual memory in a NUMA system. To achieve this aspect, the operating system of the present invention includes means for maintaining the hierarchical tree abstraction of the hardware architecture of the multiprocessor system, means for maintaining a memory pool at each node representing a memory locale for allocation of virtual memory of the system, said virtual memory being divided into pool units that may be allocated to the memory pools, and means for maintaining a pool unit table, which identifies the availability of pool units and the memory pools to which each of the pool units has been allocated.

The features and advantages of the invention may be realized and obtained by means of the instrumentalities and combinations particularly pointed out in the written description and claims hereof, as well as the appended drawings.

BRIEF DESCRIPTION OF THE DRAWINGS

The accompanying drawings which are incorporated in, and constitute a part of, this Specification illustrate several embodiments of the invention and, together with the description, serve to explain the objects, advantages, and principles of the invention. In the drawings.

FIGS. 6A–6E are flowcharts of operations performed by a virtual memory manager constituting a part of the operating system of the present invention.

DETAILED DESCRIPTION OF THE PREFERRED EMBODIMENTS

Hardware System Overview

Figure 1A:
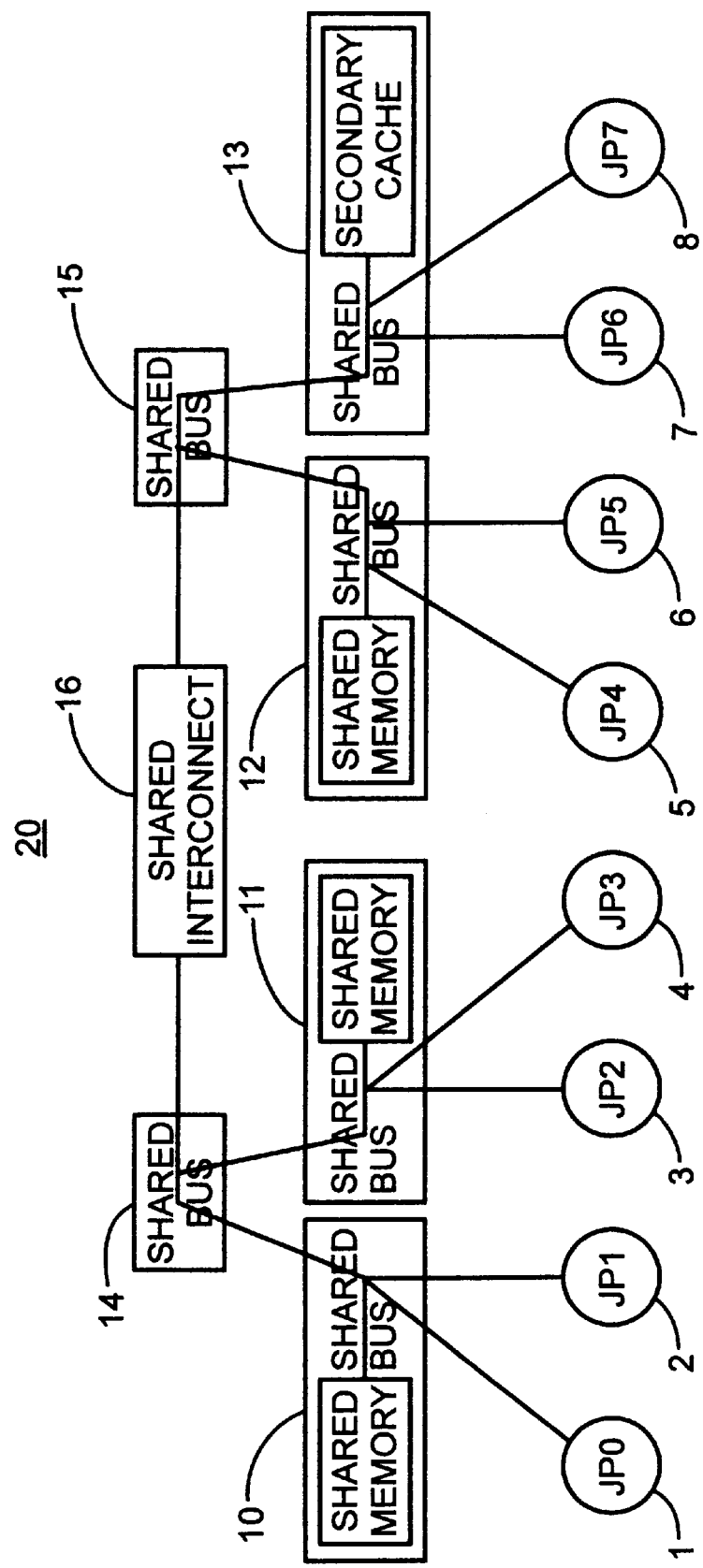
FIG. 1A is a block diagram illustrating an overview of an exemplary non-uniform memory access (NUMA) multiprocessor system.

FIG. 1A shows an example of a NUMA multiprocessor system 20 in which the operating system of the present invention may be implemented. For clarity and ease of presentation, NUMA multiprocessing system 20 is depicted as including eight job processors (JPs) 1–8. As will be readily appreciated by those skilled in the art, the invention is applicable to NUMA multiprocessor systems having other numbers of JPs. It is also not necessary that each JP group have two members or that all JP groups have the same number of JPs. The present invention may also be applicable to UMA systems where memory access times are equal throughout the system but where there is a desire to balance local-bus bandwidth usage.

As used and described herein, a NUMA system is a system having distributed memory where each piece of memory is closer (less expensive to access) for some JPs than for others, although all memory resources are accessible to all JPs. Thus, a NUMA operating system preferably should be increasingly sensitive to locality of reference and should explicitly manage memory placement to achieve ideal performance.

Each JP 1–8 may have an individual primary cache (not shown), which typically includes at least separate data and instruction caches, each being, for example, 8K bytes of random access memory. In addition to the instruction and data cache components of these primary caches, an additional cache memory of, for example, 1 megabyte of random access memory may be included as a part of the primary caches in a typical system. In the example illustrated in FIG. 1A, each pair or group of JPs may be connected to one or more shared memory resource, such as a secondary cache 10–13. For example, JPs 1 and 2 may be connected to secondary cache 10; JPs 3 and 4 may be connected to secondary cache 11; JPs 5 and 6 may be connected to secondary cache 12; and JPs 7 and 8 may be connected to secondary cache 13. Additionally, the shared memory resources 10 and 11 may be connected to another one or more shared resource at node 14, such as a tertiary cache, and the shared memory resources 12 and 13 may also be connected to one or more shared resource 15. Alternatively, shared resources 14 and 15 may be a system bus, or interface. Shared resources 14 and 15 may be connected to one or more common shared resource, such as additional shared memory and/or a main system bus 16. Thus, as shown in FIG. 1A, each box representing a shared resource may represent more than one shared resource. To be a NUMA system, however, there must be memory at nodes 10–13 or 14–15.

NUMA multiprocessor systems, such as that shown in FIG. 1A, may have nonsymmetric architectures such that each of shared resources 10–13 may include different amounts of memory. Further, JPs 1–8 may have different processing capabilities. Additionally, the hardware need not even be organized as a hierarchy, as long as its key shared resources can be adequately represented by a hierarchical system abstraction. For example, the hardware could have a mesh-based system organization. To handle these variations across the system and to permit seamless integration of different hardware components, the operating system of the present invention utilizes an abstraction of the NUMA multiprocessor system, as will be described in more detail below.

Operating System

In multiprocessor systems such as that shown in FIG. 1A, the operating system (or kernel) typically includes various processes or methods executed on one or more of the job processors and/or a dedicated system processor. The components of the operating system as described hereinafter refer to some of the processes performed by the operating system.

Figure 1B:
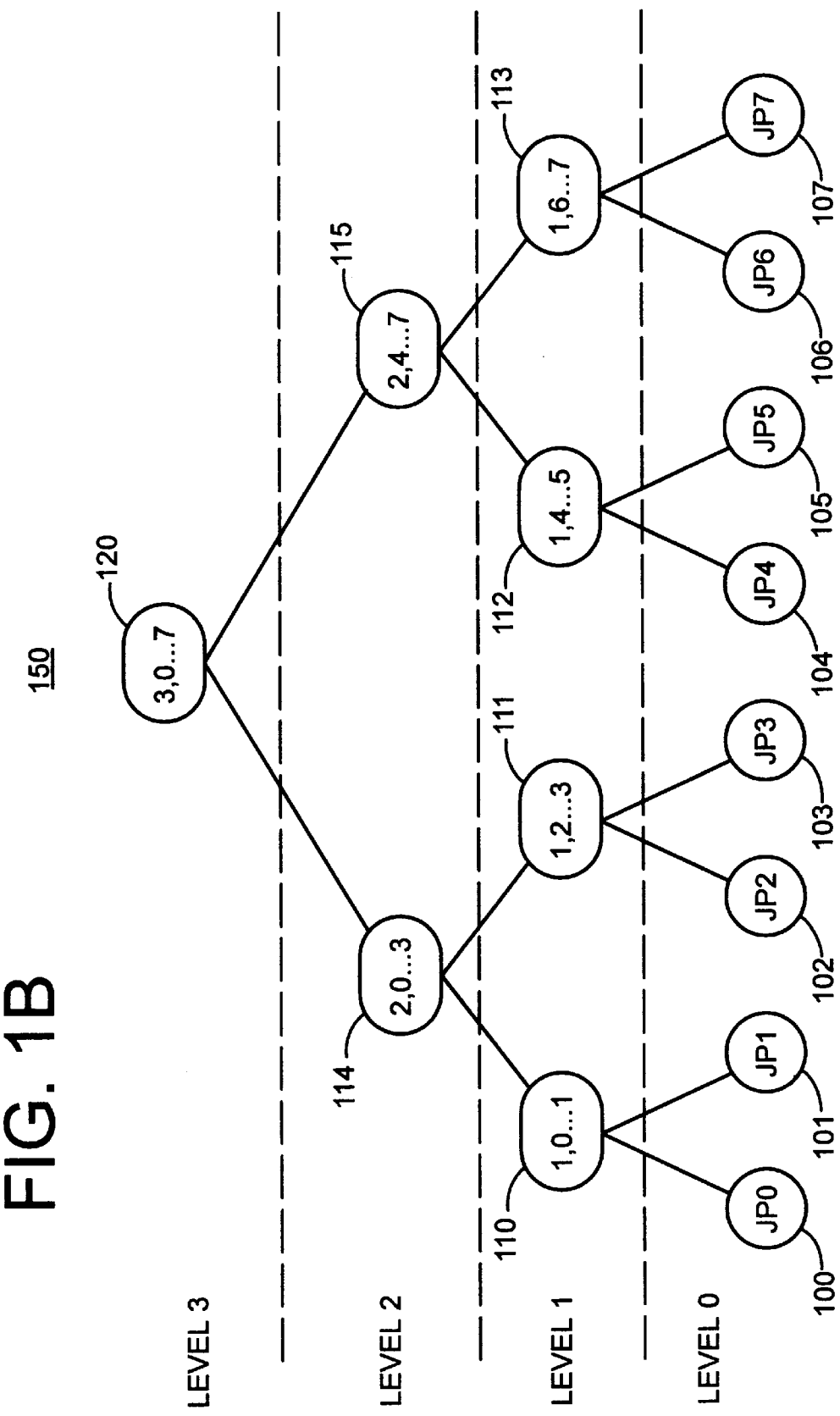
FIG. 1B is a block diagram illustrating an abstraction of the non-uniform memory access (NUMA) multiprocessor system shown in FIG. 1A.

FIG. 1B shows an overview of a software abstraction 150 by an operating system of the non-uniform memory access (NUMA) multiprocessing system 20 in which the operating system may be implemented. Leaf nodes 100–107 represent JPs 1–8, respectively, nodes 110–113 represent shared memory, bus, and/or secondary caches 10–13, respectively, nodes 114 and 115 represent shared resources, such as shared busses/interconnects 14 and 15, and a root node 120 represents a common shared resource such as the main system bus 16 connecting shared resources 14 and 15, or the like.

Because the operating system of the present invention is designed to be flexible enough to reside in and control NUMA multiprocessor systems having various hardware architectures, the abstraction of the hardware architecture that the operating system utilizes will vary from system to system. However, as described below, the operating system will utilize various policies to establish an appropriate abstraction of the hardware architecture to manage the operation of the system in the most effective manner.

For each JP 100–107, the operating system establishes a run queue and a dispatcher. The dispatcher is a kernel subsystem that is a mechanism responsible for scheduling and executing processes on an associated JP in accordance with certain global and local scheduling policies. Another kernel subsystem in the operating system that is responsible for setting scheduling policies, which influence the scheduling mechanisms performed by the dispatchers, is referred to hereinafter as the medium term scheduler. The scheduling operation of the dispatcher and the medium term scheduler is described in detail below following a background description of "thread groups," which represent groups of threads upon which the operating system may base some of its policy making decisions. It should be understood, however, that the operating system may operate upon single processes (or single-threaded thread groups) rather than upon the multi-threaded thread groups described below.

Thread Groups

As disclosed herein, a "thread group" is a set of closely-related threads within a process that will tend to access and operate on the same data. Handling these related threads as a single globally schedulable group promotes a closer relationship between the threads in the group and individual JPs or groups of JPs, thereby improving the ratio of cache hits and overall system performance.

Figure 2:
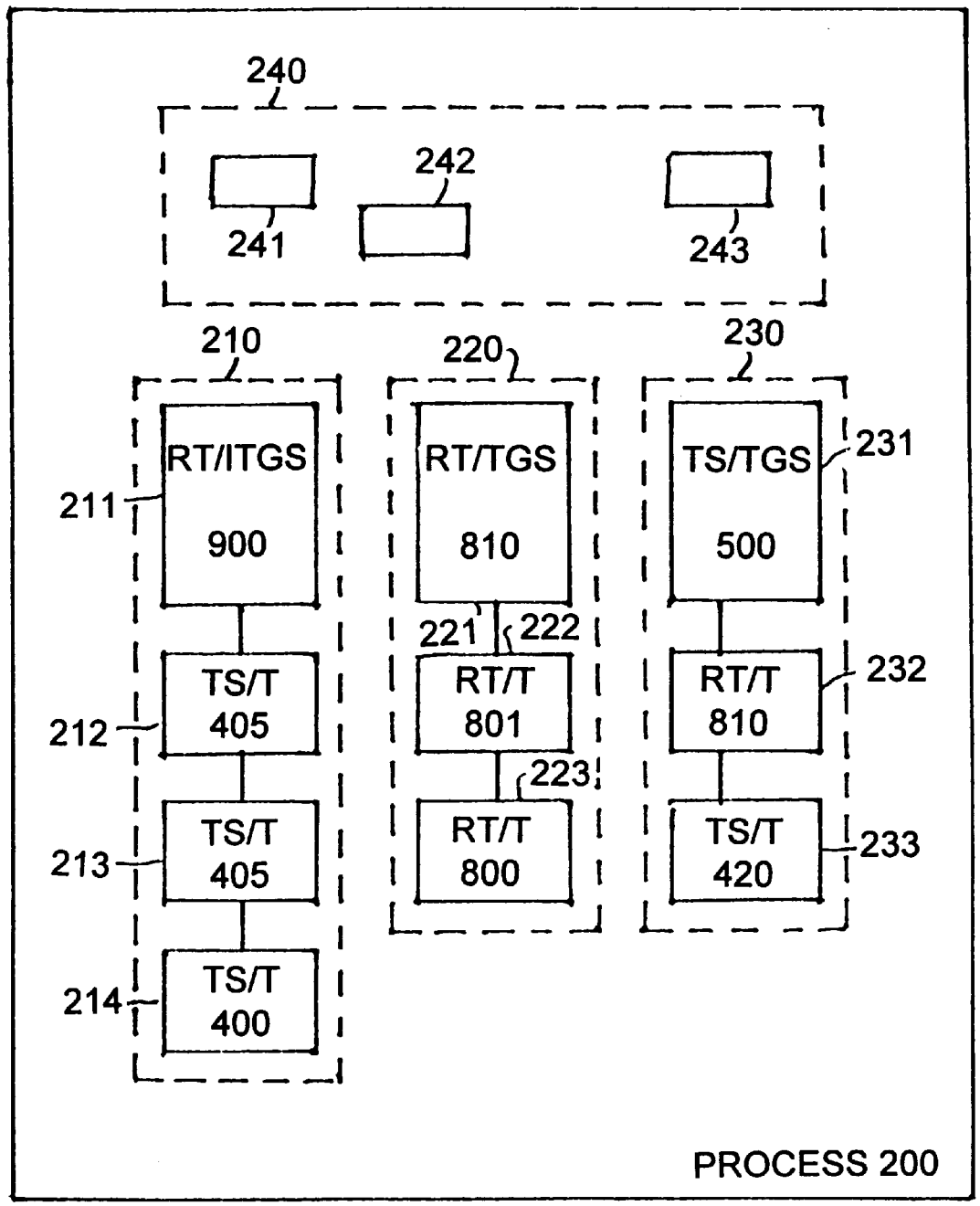
FIG. 2 is a block diagram illustrating the internal organization of a process executing on the system shown in FIG. 1A.

Referring to FIG. 2, a diagram of a typical process 200 running on system 20 is shown. Process 200 contains thread groups 210, 220, and 230. TG 210 is a real-time (RT) thread group and was the initial thread group in process 200. TG 210 has thread group structure (TGS) 211 and three time-sharing (TS) threads 212–214 within its thread group. TG 220 has thread group structure 221 and RT threads 222 and 223. TG 230 has thread group structure 231, RT 232, and TS 233. As will be discussed in more detail below, the number appearing within each thread group structure box 211, 221, and 231 in FIG. 2 indicates the thread group's global scheduling priority across the system. The number appearing within each thread box indicates the thread's priority within its particular thread group.

Also, conceptually located within process 200 in FIG. 2, is the set of data 240, access to which potentially will be required by threads during execution of process 200. In FIG. 2, data 241 represents the subset of data 240 that supports the task to be performed by the threads within TG 210. Similarly, data 242 and 243 support the tasks to be performed by the threads within TGs 220 and 230.

Active threads in a process may create one or more additional threads. When a new thread is created, it can be created within the creating thread's thread group, within another existing thread group, or it can be made the initial thread in a new thread group. For example, TG 220 may have been created by a thread within process 200 or by a thread in another process in the system. If a thread is being formed as the initial thread in a new thread group, the new thread group's thread group structure is first created by inheriting the thread group structure of the creating thread's thread group. Then the new thread is created in the newly created thread group. The creating thread assigns the local scheduling and priority to the newly created thread. Unless otherwise specified, the newly created thread will inherit the local scheduling policy and priority of its creating thread. The newly created thread may have a priority that is higher, lower, or the same as the priority of the thread that created it. Similarly, individual threads within a thread group may have a priority that is higher, lower, or the same as the priority of its thread group.

The thread group structure also maintains the cumulative timeslice and JP accounting for all threads in its thread group, so timeslicing and JP accounting records for individual threads within a thread group are not necessary. Each individual thread within the thread group maintains the thread priority and scheduling policy for itself.

The particular method used by a JP's dispatcher in selecting a thread group to execute is discussed below. Once a dispatcher selects a particular thread group for execution, the dispatcher selects an individual thread from the thread group for execution based on the local priority and scheduling policy of the threads within the group. Selection of a thread for execution, therefore, occurs at two independent levels: global scheduling of a thread group followed by local scheduling of one of that thread group's threads. The priorities of the individual threads within a thread group have no bearing on the scheduling of the thread group itself, which is based on the thread group's priority in the thread group structure.

Execution of a process will often involve a plurality of thread groups, each with a plurality of threads. The use of thread groups in developing a process gives the user the flexibility to choose between creating a new thread within an existing thread group or creating a new thread group. The user can make that decision based on the most efficient approach to handle the various tasks within the process. If, for example, a number of threads are being used to work on a particular calculation and all threads will require access to the same set of data, those threads properly belong in a single thread group. On the other hand, if a process is going to initiate a new task within the process that is not closely coupled with the task of an existing thread group and the threads of the new task will require access to a different subset of data 240, then a new thread group is indicated.

Process Scheduling

As described above, the operating system utilizes an abstraction of the hardware architecture, which is preferably represented as an inverted tree hierarchy of shared resources, memory locales, and JPs. An example of such an abstraction is shown in FIG. 1B. In this JP/Memory-tree hierarchy, the JPs are identified by a unique ID number and each memory locale or other shared resource is identified by a (level, JP-ID) nomenclature where the level specifies the vertical position within the hierarchical tree (higher number levels being closer to the root node of the tree and the zero level representing the leaf nodes or JPs of the tree) and the JP-ID specifies the horizontal position using any descendent JP of the desired locale. For example, in FIG. 1B, specifiers (2,JP2) and (2,JP0) both refer to the same memory locale, while (2,JP2) and (2,JP4) refer to different locales. Each level can be considered to contain one or more "instances" or nodes in the JP/Memory tree hierarchy. Level 0 contains eight nodes, each corresponding to one of the JPs 100–107. Level 1 contains four Level 1 nodes 110–113, each node corresponding to one of the shared memory resources and its subordinate JPs. Level 2 contains two Level 2 nodes 114 and 115, each corresponding to two Level 1 nodes and a shared resource. Finally, there is a single Level 3 node 120 corresponding to the two Level 2 nodes and at least one shared system resource. This nomenclature simplifies implementation by freeing software, in many cases, of the need to know how many nodes are at each level in the system.

The purpose of abstracting the system hardware using a hierarchical tree structure is to provide a representation of the access costs associated with traversing from one node to another. For example, the cost for JP 101 to read from a secondary cache represented by node 110 is much less than the cost may be for the same JP to read from a secondary cache represented by node 112 due to hardware access latencies and limited bandwidths of the system buses. Thus, the hierarchical tree abstraction groups those shared resources and JPs having the lowest cost associated with the interaction between the JPs and the shared resources of the group.

As mentioned above, not every system will be represented by the same abstraction. For example, in a uniform memory access system, all JPs are directly connected to a common shared memory. Thus, the cost associated with each JP accessing the common memory will be the same for the other JPs, and all memory would be represented in the root node of the hierarchy. However, in a non-uniform memory access (NUMA) system, some of the JPs may be directly connected to one shared memory resource while other JPs may be connected to another shared memory resource. Further, the number of JPs that are directly connected to one memory resource may be different than the number connected to another memory resource. By providing a hierarchical abstraction of such a system, the operating system can establish policies for encouraging JPs to access local memory to which they are more closely affined, and to limit JP access to more remote memory resources that may require utilization of system resources of limited accessibility.

The configuration of an abstraction of a multiprocessor system requires the reconciliation of two competing system goals. On the one hand, the JPs must be allowed to execute processes as efficiently as possible. On the other hand, system throughput should be maximized to the greatest extent possible. Referring to FIG. 1B, all threads that are "visible" at Level 3 can be taken and executed by any of the dispatchers of the eight JPs 100–107. Since there are eight JPs that may potentially run the threads at Level 3, this maximizes the opportunity of each thread to run. This will, however, result in threads from the same thread group being run in different JP groups (i.e., JPs 100 and 101, JPs 102 and 103, JPs 104 and 105, or JPs 106 and 107). System throughput suffers because threads from multiple thread groups spread across JP groups will result in more cache activity.

On the other hand, if all thread groups were to be assigned to a specific JP, local cache affinity would be clearly enhanced, since the likelihood of cache hits is higher with all threads that are working on the same set of data running on the same JP. Assignment of time critical threads to a single JP is not desirable, however, since it increases the likelihood that a JP will become busy and not be able to execute all time critical threads on schedule.

As mentioned above, in a preferred embodiment of the operating system, there are two layers of scheduling. All thread groups have a group priority and can be scheduled by the medium term scheduler to compete for JP resources available anywhere in abstracted system 150. Once a JP dispatcher has selected a thread group to run, the dispatcher will select a thread within the thread group according to the local priorities within the thread group.

Referring again to FIG. 2, the priorities of the thread groups and threads will be examined. As can be seen, the priority of the thread group can be either higher or lower than the priority of the individual threads within that thread group. In the example of process 200 in FIG. 2, TG 210 has been assigned a priority of 900, TG 220 has a priority of 810, and TG 230 has a priority of 500. If, for example, thread groups 210, 220, and 230 happened to be the only thread groups active in system 150, then the dispatcher of the next available JP would select TG 210 as the source of the next thread to run, since TG 210 has the highest priority of the available thread groups.

Once a dispatcher selects a TG 210, the dispatcher takes the particular thread to be run from the local thread group run queue. TG 210's active threads 212–214 have priorities of 405, 405, and 400, respectively. Threads are placed on their run queues in order of their priorities. The order of threads of equal priority within the run queue is determined by local scheduling policy.

As is well understood, it is highly desirable to maximize the likelihood that the data needed by a thread is to be found in the local cache of the JP running the thread or, if not there, in the secondary cache associated with that JP's JP group. Trips to higher level shared memory to get data not located in the caches introduce delay into the processing of the thread and impact overall system throughput. Similarly, accessing far memory, rather than near memory, also introduces delay. At the same time, steps taken to increase cache locality cannot impact the timely execution of time critical thread operations.

Associated with each thread group, and available to all JPs in the system, are attributes specifying the thread group's allowable JP or set of JPs and the thread group's minimum allowed processing level. The JP attribute identifies the specific JP or set of JPs in the system on which the thread group is allowed to run. Typically, this attribute will identify all JPs in system 150 as being allowable, though a subset of system JPs could be specified by the user. The minimum allowed processing level attribute specifies the minimum processing Level (0, 1, 2, or 3) at which the thread group may be affined. This attribute can be used to override processor affinity policies in favor of real time schedule semantics.

The minimum allowed processing level for timesharing thread groups will typically be 0. This will allow the thread group to move down to Level 2, where the thread group will be affined to a particular group of four JPs sharing a tertiary cache at Level 2, to Level 1, where the thread group will be affined to a particular group of two JPs sharing a secondary cache, or to Level 0, where the thread group is affined to a specific JP. Affining a thread group to a specific JP or single group of JPs improves cache locality for the threads in the thread group.

The minimum allowed processing level for real-time thread groups will typically be the root level (Level 3 in this example), which will preclude the thread group from moving below the top processing level, ensuring that the thread group will always be available to the maximum number of JPs. Response time for real-time thread groups is, therefore, optimized. The user can specify, via the minimum allowed processing attribute, that a real-time thread group be allowed to moved to Level 2, Level 1, or Level 0.

In a preferred embodiment of the invention, maintaining affinity between thread groups and processing instances is accomplished by means of the system run queues. In the abstracted system shown in FIG. 1B, there will be a total of fifteen run queues: eight Level 0 queues (one for each JP), four Level 1 queues, two Level 2 queues, and one Level 3 queue. Every available thread group will be in one, and only one, of these fifteen queues. A newly created thread group inherits the run queue of the creating thread group as well as its affinity attributes.

Referring to FIG. 2, for example, when TG 230 is first created, it inherits the affinity of its creator and is placed in the run queue for the locale corresponding to the creating thread group. Since TG 230 is a timesharing thread group, when one of the JPs 100–107 eventually selects it to run for the first time, TG 230 is "pulled down" to the particular JP associated with the dispatcher that selected it. The selecting dispatcher accomplishes this by removing the thread group from the Level 3 run queue and placing it in its own Level 0 run queue. That JP is now affined with TG 230 and will continue to run the threads in TG 230 until TG 230 is either reaffined or the run queues are reset, as discussed below. The dispatchers maintain the run queues, which include a list of loadable thread groups that exist at a particular node for each of the nodes of the JP/Memory-tree hierarchy. The dispatcher can identify the run queues by the unique nomenclature of its associated node.

To provide a global scheduling mechanism in a system having a NUMA architecture, a level in the hierarchical tree is selected as a "scheduling level." The "scheduling level" is the level in the hierarchical tree at which the medium term scheduler performs its scheduling operations. Each node of the hierarchical tree that is in the scheduling level is referred to as a "scheduling locale." A scheduling locale and its child nodes are referred to as a "scheduling subtree." For purposes of example, in the hierarchical tree shown in FIG. 1B, if Level 2 is the scheduling level, then nodes 114 and 115 are the scheduling locales and nodes 100–103, 110, 111, and 114 belong to one scheduling subtree and nodes 104–107, 112, 113, and 115 belong to another scheduling subtree. On the other hand, if Level 1 is the scheduling level, nodes 110–113 are the scheduling locales and nodes 100, 101, and 110 belong to one scheduling subtree, nodes 102, 103, and 111 belong to another scheduling subtree, nodes 104, 105, and 112 belong to a scheduling subtree, and nodes 106, 107, and 113 belong to another scheduling subtree.

Any level in the hierarchical tree may be selected as the scheduling level. However, whatever level is selected as the scheduling level, the selected level will be considered as the local memory level for scheduling. Thus, selection of a scheduling level affects the JP/memory affinity and provides a basis for assigning costs for moving a process from one node to another as is described in more detail below.

An important aspect of designating a level in the hierarchical tree as a scheduling level and the nodes in the scheduling level as scheduling locales, is to enable thread groups to be assigned a "home-scheduling locale" and a "current-scheduling locale." A "home-scheduling locale" of a thread group or process is the scheduling locale that is an ancestor node of the preferred JPs for executing the thread group or process. A "current-scheduling locale" of a thread group is the scheduling locale that is an ancestor node of the JP that last executed the thread group. A thread group may have a different home-scheduling locale than its current scheduling locale. Such a situation would occur when a thread group is moved from one scheduling subtree to another in order to keep a JP busy that has no eligible thread groups. However, to improve JP/memory affinity it is preferable that a thread group have the same home- and current-scheduling locales because each scheduling locale represents different physical memory and JPs operate more efficiently if they use local resources.

The medium term scheduler provides a balance between the JP/memory affinity and system throughput tradeoff by monitoring thread groups to identify languishing thread groups and candidates for load balancing, by monitoring the loads of the respective scheduling locales to identify any load imbalances, and by identifying any thread groups that do not have the same current- and home-scheduling locales. When the medium term scheduler identifies a thread group that has a different current-scheduling locale than its home-scheduling locale, the medium term scheduler may (a) send home the thread group by moving it back to its home-scheduling locale, (b) "migrate" the thread group by changing its home-scheduling locale to match its current-scheduling locale, or (c) leave the thread group at its current-scheduling locale without changing its home-scheduling locale.

When the medium term scheduler identifies a languishing thread group, it may assist the thread group in one of three ways. First, it may boost the priority of the thread group to increase the likelihood that the JP dispatcher whose run queue includes the thread group will select and execute the thread group. Second, the medium term scheduler may "promote" a thread group to the run queue of a higher node to increase its visibility to other JPs. Third, the medium term scheduler may set a poach/help hint flag associated with the thread group to identify the thread group as a good thread group for a JP to either "poach" or "help." A "poach" or a "help" occurs when a dispatcher associated with an idle JP in one scheduling subtree retrieves a thread group languishing in a node of another scheduling subtree. A "languishing thread group" is one that is queued in a run que for a predetermined time period, such as 800 msec, without being executed. If the languishing thread group has threads being executed by a JP in the remote scheduling subtree, a dispatcher of an idle JP will "help" the thread group by selecting the highest priority thread in the thread group to execute. Otherwise the dispatcher will "poach" the thread group by taking the entire thread group. When a thread group is "poached," the current-scheduling locale for the thread group is changed to that of the poaching dispatcher. When a thread group is "helped," the current-scheduling locale for the thread group remains at the scheduling locale for the scheduling subtree from which the thread group was initially located, and the thread group that is helped is returned to its initial location after the thread group is executed.

FIGS. 3A–3D show the sequence followed by the dispatcher 500 of JP 100 in selecting a thread group (TG) to execute. A similar sequence is followed for all dispatchers in the system. When JP 100 becomes available to execute a thread (step 501), its dispatcher first searches the run queues of its ancestor nodes in the hierarchy tree in a specific order until a first predetermined delay time has expired. Thus, dispatcher 500 begins this process by setting a timer (step 503).

The dispatcher initially looks for the highest priority eligible thread group in its Level 0 run queue and its ancestor nodes at Levels 1–3. In the case of JP 100, the dispatcher would search the run queues for nodes 100, 110, 114, and 120 (step 505) looking for an eligible thread group (step 507). If the dispatcher does not find an eligible thread group, then it will look at the next relative node in the precomputed list of relatives for JP 100 (step 509). The level within the scheduling hierarchy on which the node resides will determine the amount of delay that must occur before the run queue at this level may be searched. If the timer for this level's node has not yet expired, then the dispatcher will execute an "idle" thread causing JP 100 to enter an idle state (step 515). If the timer has expired, then the dispatcher will search the entire subtree, whose root was the next relative in the relative list, for a thread group to execute (step 513). If there is no eligible thread group, then the dispatcher will return to step 505. This procedure will be repeated until the dispatcher finds an eligible thread group to run.

The idle thread group is special in that it is always eligible and always has the worst possible scheduling global priority. Each of the JPs 100–107 has an idle thread group on its run queue. If none of the ancestor nodes or relative nodes contain an eligible thread group with a priority better than the idle group, then the dispatcher will pick this thread group to run. The idle thread has built-in delays to prevent it from being too aggressive in looking for work, as this could result in cache lines being frequently invalidated, which would reduce the overall system performance.

The delay times that the dispatcher observes are based upon a node's level within the hierarchy tree. Each level can have a different delay value. These values are configurable with default values based on the machine's architecture. Generally the higher the node's level, the longer the delay. The rationale here is that as the dispatcher searches relative nodes higher in the tree, it is crossing cache, memory local, and bus/interconnect boundaries. This would mean that it is likely to be more costly to execute thread groups that are currently attached to these distant nodes.

Once the dispatcher has located a run queue that appears to have an eligible thread group to run, it will begin searching the individual thread groups that are on the run queue's eligible list. First, the dispatcher will determine whether the run queue is in the same or a remote scheduling tree (step 523, FIG. 3B). If the run queue is in the same scheduling locale as the dispatcher, then the dispatcher simply searches the eligible list of the run queue, which is sorted in priority order for a thread group whose priority is better than that of the idle thread group (step 525). If no acceptable thread group can be found, then the dispatcher will return to step 505.

If the dispatcher is searching in a remote locale, then it will first scan the eligible list to see if any of the thread groups have been marked as good candidates to be poached or helped by the medium term scheduler (step 527). If not, then the dispatcher will search for a thread group based on priority (steps 525 and 529). The rationale here is that a thread group that has been marked as a good candidate for poaching/helping has been languishing for some time and is less likely to have a hot cache footprint that would become invalid if the thread group is executed on a remote JP.

Figure 3A:
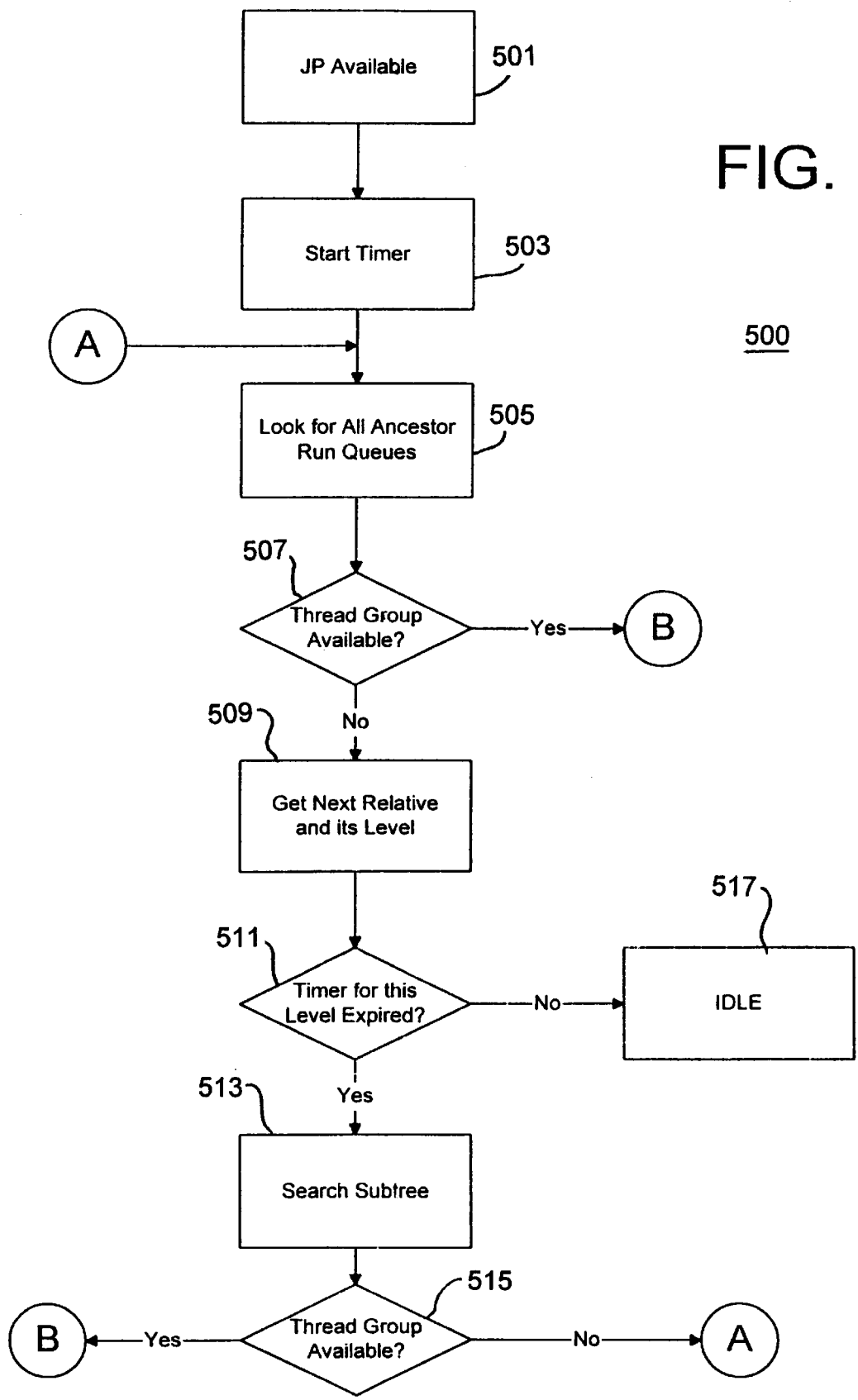
FIGS. 3A–3D are flowcharts of operations performed by a dispatcher of the present invention in selecting a thread group for execution.
Figure 3B:
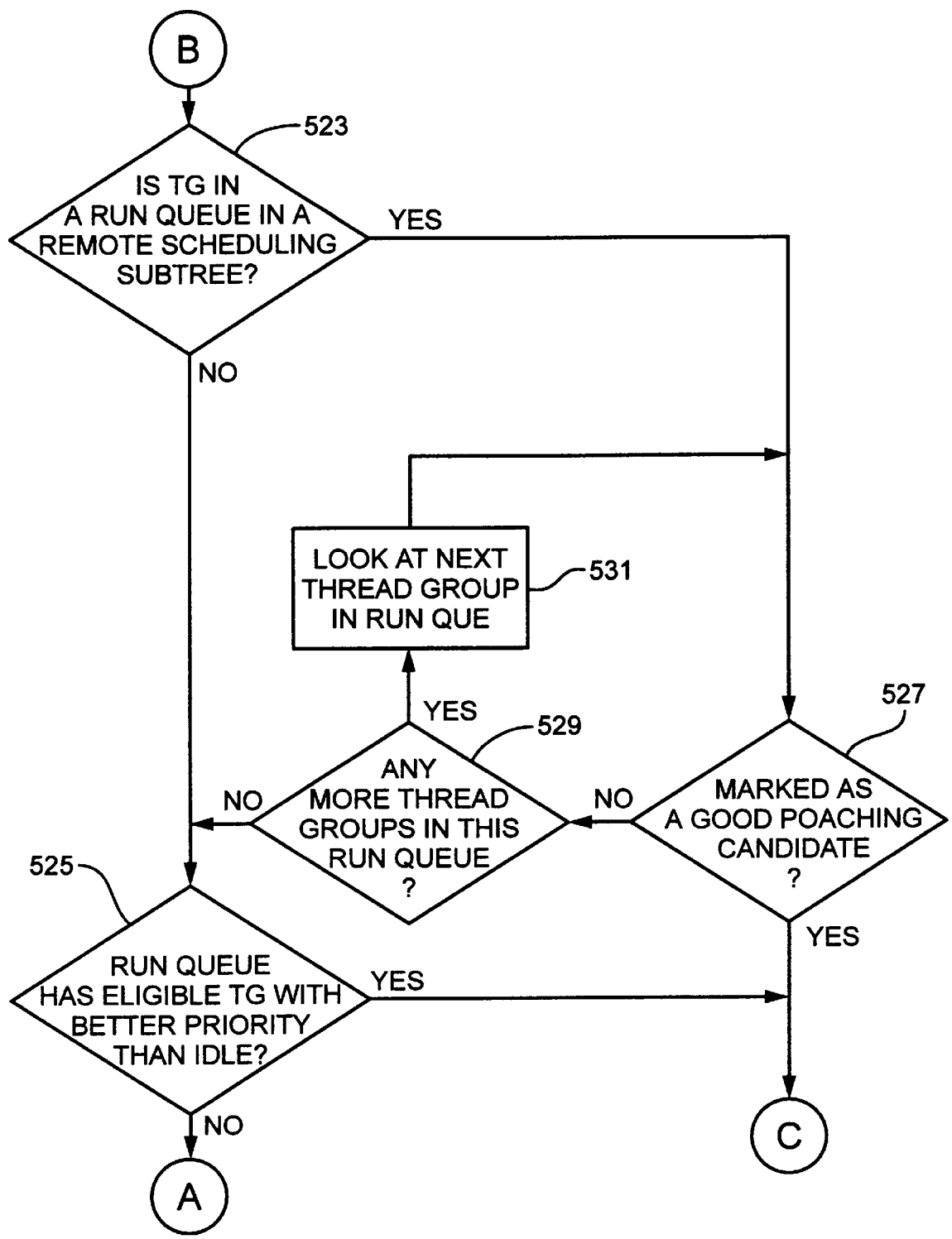
Figure 3C:
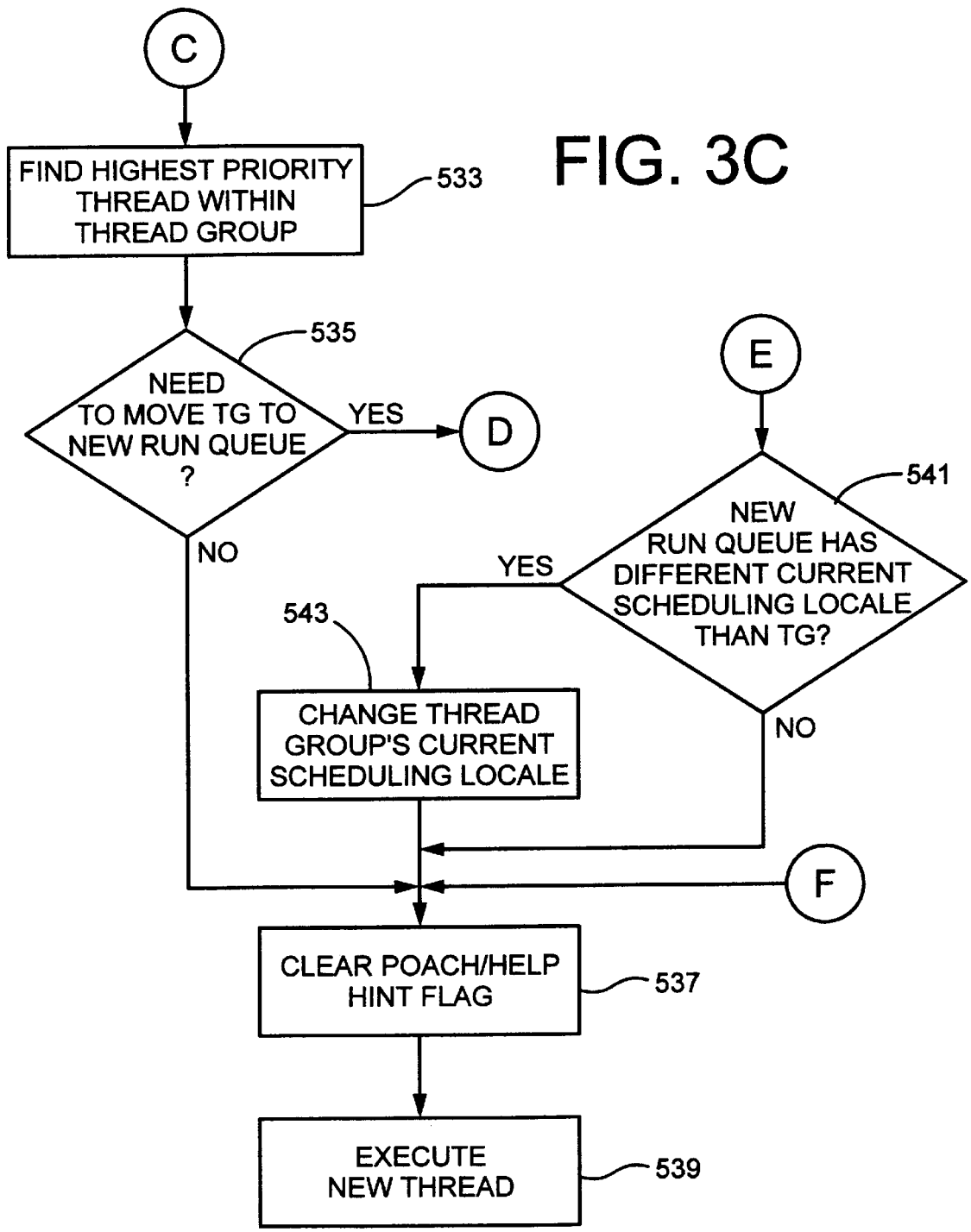
Figure 3D:
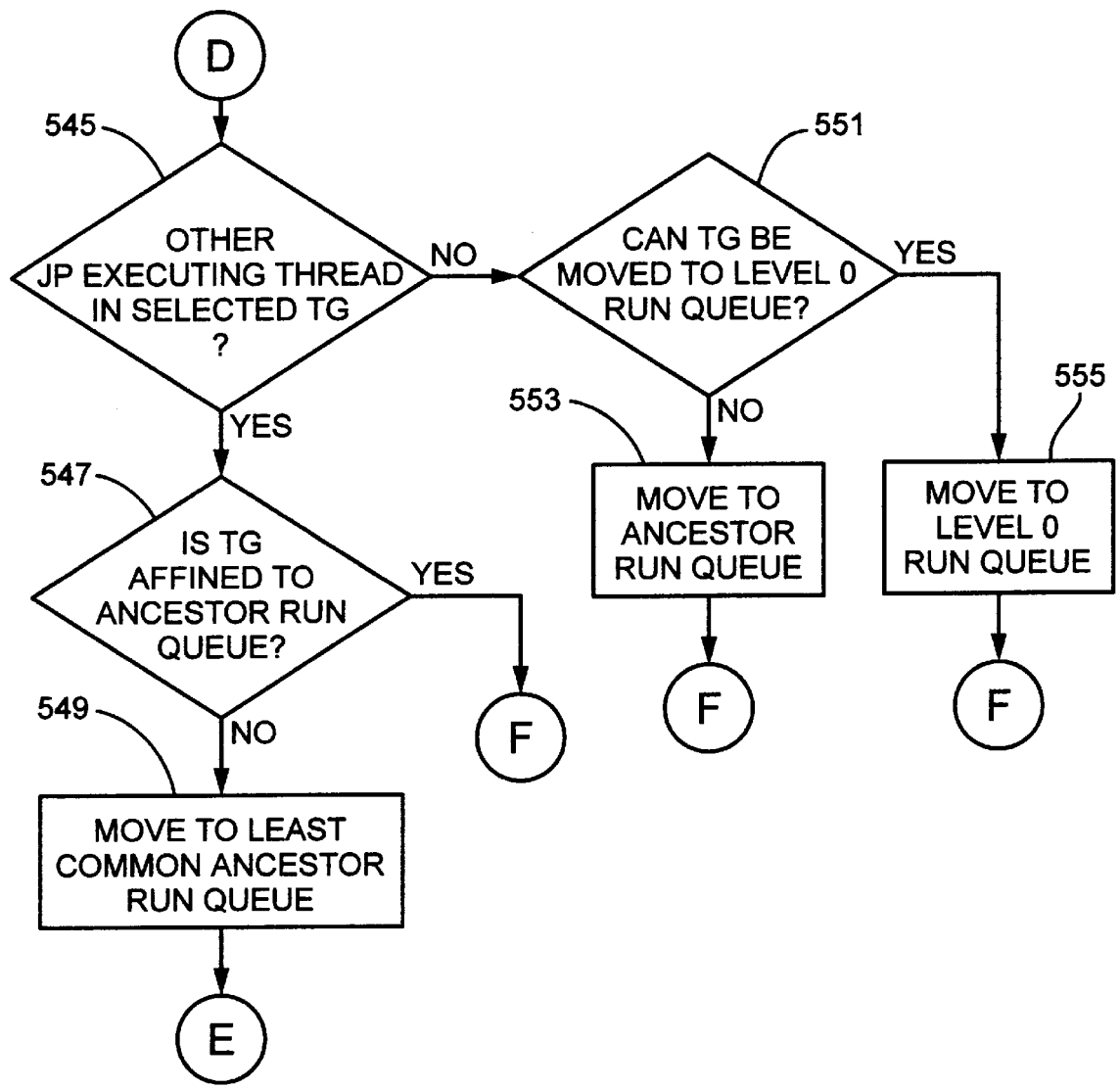

Once the thread group has been picked, then the thread with the best priority within the selected thread group is picked to run (step 533, FIG. 3C). Next, the dispatcher determines if the selected thread group needs to be moved to a new run queue (when the thread group is not in the run queue for JP 100) (step 535). If the thread group was found on the run queue for JP 100, then the poach/help flag is cleared (step 537) and a new thread begins execution (step 539). Otherwise, it may be necessary to move the thread group to a new run queue. If the thread group does not have any other threads that are currently being executed by other JPs (step 545, FIG. 3D), the dispatcher checks to see if the thread group can be moved to a Level 0 run queue (step 551). If it can, then the dispatcher moves the thread group to the run queue for JP 100 (step 555), clears the poach/help flag (step 537, FIG. 3C), and begins execution (step 539). Otherwise, the dispatcher moves the thread group to the ancestor node's run queue whose level matches the lowest level that the thread group is allowed to be placed (step 553, FIG. 3D).

If the thread group has other threads currently being executed (step 545), the dispatcher determines whether the thread group currently resides on an ancestor node's run queue (step 547). If the thread group currently resides on an ancestor's run queue, then the dispatcher leaves the thread group where it is, clears the poach/help flag (step 537, FIG. 3C), and begins execution of the chosen thread (step 539). Otherwise, the dispatcher locates the least common ancestor for JP 100's run queue and the run queue where the thread group is currently residing and moves the thread group to that run queue (step 549). The least common ancestor is the run queue with the smallest level number that is an ancestor to both the JP 100 and the run queue of the chosen thread group. For example, if the dispatcher decides to run a thread group that is currently affined to node 115, the least common ancestor would be the root of the tree, node 120. The least common ancestor was precomputed at system initialization time and stored in a data structure that is readable by the dispatcher.

If a thread group is moved to a different run queue and the thread group has no other threads currently being executed, then the current-scheduling locale of the thread group will be changed if the new run queue is in a different locale than the run queue where the thread group currently resides (step 543). This corresponds to a JP "poaching" a thread group. If the thread group has other threads currently being executed, then the current-scheduling locale of the thread group is not modified and, instead, the JP simply "helps" the thread group.

From the above description, it can be seen that timesharing thread groups can move up and down through the three processing levels of the system and can, at various times, be affined with individual JPs, with groups of JPs, or with all JPs in the system.

The system described above has an inherent tendency to balance the processing load. If the system is in a relatively idle period, timesharing thread groups tend to get pulled up to higher level run queues by dispatchers searching for executable threads, and have their threads shared by multiple JPs. JPs that find themselves with a light workload will help out busier JPs and, over time, tend to take over some timesharing thread groups from the busier JPs in the system. Conversely, if the system becomes busy, timesharing thread groups tend to move downward. This closer affinity between timesharing thread groups and JPs improves cache locality and is desirable.

In most situations, the timesharing thread groups will distribute themselves in a substantially even manner across the JPs by operation of the dispatchers. It is theoretically possible, however, that thread groups in a busy system may become distributed in an unbalanced manner such that some JPs are busier than others causing some thread groups to be executed at a slower than desirable rate.

The medium term scheduler further ensures that processing and memory loads do not become unbalanced by computing scheduling locale load data (SLD) for each scheduling locale, monitoring the progress of thread groups, assisting languishing thread groups, and moving the home- or current- scheduling locales for certain thread groups. The manner by which the medium term scheduler 600 performs these functions is described further below with reference to FIGS. 4A–4H.

Medium term scheduler 600 periodically checks the status of all active thread groups in the system one at a time (step 603) to determine whether they are progressing or languishing (step 609) and whether they have been poached (step 625). Each time the medium term scheduler looks at the status of a thread group, it checks whether the SLD is stale (step 605). If the SLD is stale, the medium term scheduler computes new SLD (step 607) by computing JP, memory, priority, and composite load values for each scheduling locale.

The JP load for a scheduling locale is the number of eligible entities (threads) in run queues of the associated scheduling subtree. The memory load for a scheduling locale is the number of configured bytes of used memory within the associated scheduling subtree.

The medium term scheduler computes the priority load by maintaining and accessing a global list of eligible thread groups ordered by their priorities. The medium term scheduler groups the thread groups in the list having priorities that are the same or substantially the same and assigns "priority points" to each thread group in the groupings. For example, the thread groups in the grouping having the highest priorities may be assigned a priority point of 20 and the thread groups in the grouping having the next highest priorities may be assigned a priority point of 19. The assignment of sequentially decreasing priority points continues until a value of zero is reached (in which case, all of the thread groups having lower priorities are also assigned a priority point of zero) or until all of the groupings have been otherwise assigned priority points. The medium term scheduler then goes through the list and determines the current locale of each thread group and accumulates the assigned priority points for each thread group within the scheduling subtree for each scheduling locale. This accumulated value for each scheduling locale is the priority load for the schedule locale.

The composite load for each scheduling locale is a sum of weighted, normalized JP, memory, and priority loads. The JP, memory, and priority loads are normalized to a value between zero to 100, and are weighted based on performance criteria, such as whether the available system memory is relatively small. The medium term scheduler can determine whether the SLD is stale using a staleness factor counter, which is reset each time the SLD is refreshed and decremented following particular routines in the process.

To assist a thread group that is languishing (step 609), the medium term scheduler monitors the time during which the thread group is queued but not executed, and performs one of the following three functions when an associated time period has expired as determined in steps 611, 615, and 619 (FIG. 4B): (1) boosting the priority of the thread group (step 613); (2) promoting the thread group to a higher, more visible level in the hierarchical tree (but no higher than the scheduling level) (step 617); or (3) setting the poach/help hint flag of the thread group (step 621). Because a dispatcher looking for work will select the thread group having the highest priority, boosting the priority of a thread group (step 613) increases the likelihood that a dispatcher looking for work will select the thread group. However, if the JP is currently executing a lengthy process or if higher priority thread groups remain in the JPs run queue, boosting the thread group's priority may not significantly increase the likelihood that the thread group will be executed any quicker.

If after a second predetermined time period has expired, the medium term scheduler determines that the thread group has not progressed, the medium term scheduler will promote the thread group to the next higher, more visible level in the hierarchical tree (but no higher than the scheduling level) (step 617). This promotion makes the thread group immediately visible to the dispatchers of all subordinate JPs, thus increasing the likelihood that a dispatcher in the same scheduling subtree will select a languishing thread group.

If the thread group has still not progressed after a third predetermined period of time has expired, the medium term scheduler will set the thread group's poach/help hint flag. Because a dispatcher looking for work in another subtree will take a thread group having its poach/help flag set before it takes a thread group not having its poach/help hint flag set, setting this flag increases the likelihood that a dispatcher in a different scheduling subtree will poach or help the thread group.

The first, second, and third predetermined time periods after which the medium term scheduler respectively priority boosts, promotes, or sets a hint flag for a thread group, may be independent from one another such that the manner in which the medium term scheduler will assist languishing thread groups may be varied from system to system based upon system characteristics to improve the system's throughput. As an example, the first predetermined time period may be 8,000 msec, the second predetermined time period may be 2,000 msec, and the third predetermined time period may also be 2,000 msec. Thus, if the medium term scheduler performs its routine once every one second, a thread group that has been queued, but not executed for two cycles of its routine (2,000 msec), will have its poach flag set and will be promoted then and every 2,000 msec interval thereafter. If a thread group is languishing after eight cycles (8,000 msec), it will have its priority boosted then and every 8,000 msec interval thereafter. By assisting languishing thread groups, the medium term scheduler prevents or corrects scheduling inequities.

The medium term scheduler also sets a dampening factor for each thread group when it is first created by an Exe( )

command or migrated to another scheduling locale. The dampening factor is set to prevent the medium term scheduler from cache thrashing in response to load imbalances without first allowing the dispatchers to attempt to balance the loads. Each time the status of a thread group is checked, the medium term scheduler decrements the dampening factor of the thread group (step 623, FIG. 4A). Thus, when a thread group's scheduling locale is changed and its dampening factor is set to a value of five, for example, the medium term scheduler will not attempt to migrate or otherwise move the thread group until it has decremented the dampening factor to zero. Dampening prevents the medium term scheduler from migrating a thread group too frequently, thus reducing cache thrashing.

Additionally, the medium term scheduler helps ensure a balanced system processing load by migrating the home-scheduling locale for a poached thread group to its current-scheduling locale when the current-scheduling locale is less busy than the home-scheduling locale, or returning a poached thread group to its home-scheduling locale when the home-scheduling locale is less busy than the current-scheduling locale. When the medium term scheduler detects a thread group that has been poached (i.e., its current-scheduling locale is different from its home-scheduling locale), it determines whether the composite load of the thread group's current scheduling locale (CSL) exceeds that of the thread group's home-scheduling locale (HSL) by an amount greater than a predetermined "send home" threshold (step 627). If the amount does not exceed the "send home" threshold, the medium term scheduler determines whether the composite load of the thread group's home-scheduling locale exceeds that of the thread group's current scheduling locale by an amount greater than a predetermined "migrate" threshold (step 629). If neither the current- nor home-scheduling locales for a poached thread group have a load exceeding the other by more than the "send home" or "migrate" thresholds, the medium term scheduler checks whether the current-scheduling locale is busy by comparing its JP load to a "busy" threshold (step 631). If the current-scheduling locale is not busy, the medium term scheduler will increase the SLD staleness factor for the current locale (step 633) and leave the thread group in its poached state and accumulate performance data to determine when or if to migrate the poached thread group or return it home at a later time.

If the medium term scheduler determines in step 627 that the composite load of the thread group's current-scheduling locale exceeds that of the thread group's home-scheduling locale by an amount greater than the predetermined "send home" threshold, it sends the thread group back to its home-scheduling locale such that the thread group's current-scheduling locale is the same as the thread group's home-scheduling locale (step 635).

If the medium term scheduler determines in step 629 that the composite load of the thread group's home-scheduling locale exceeds that of the thread group's current-scheduling locale by an amount greater than the predetermined "migrate" threshold, the medium term scheduler then determines whether the thread group is dampened (step 637) by checking whether the dampening factor associated with the thread group is zero. If the thread group is dampened (i.e., its dampening factor is non-zero), the medium term scheduler sends the thread group home (step 635). On the other hand, if the thread group is not dampened (i.e., its dampening factor is zero), the medium term scheduler "migrates" the thread group by changing the thread group's home-scheduling locale to the thread group's current-scheduling locale (step 639). After examining a thread group, the medium term scheduler determines whether there are any more active thread groups that it has not examined (step 641, FIG. 4A) and finds the next active thread group (step 603).

As an additional check against operation of the system in an unbalanced condition over a prolonged period of time, the system will perform a "load balancing" function within each scheduling locale by periodically pulling all thread groups back up to their scheduling level run queues (step 645). The thread groups will immediately become visible to all JPs in the scheduling locale. This function prevents any unbalanced load condition from existing for more than a relatively short period of time. In a preferred embodiment, this reset function occurs every 10 seconds, though other time periods may be configured (step 643).

An additional measure to prevent system-wide imbalances is that the medium term scheduler periodically performs load balancing on a scheduling locale level. First, the medium term scheduler checks whether it is time to load balance across the scheduling locales (step 647). When it is time, the medium term scheduler locates the scheduling locale with the largest composite load value (step 649, FIG. 4D), and determines in step 651 whether the JP load is the dominant factor of the composite load. If the JP load is the dominant factor, the medium term scheduler performs load balancing using the process shown in FIG. 4E. If the JP load is not the dominant factor, the medium term scheduler checks whether the memory load is the dominant factor of the composite load (step 653). If the memory load is the dominant factor, the medium term scheduler performs load balancing using the process shown in FIG. 4F. If neither the JP load or memory load are the dominant factors, the medium term scheduler performs load balancing using the process shown in FIG. 4G.

Figure 4A:
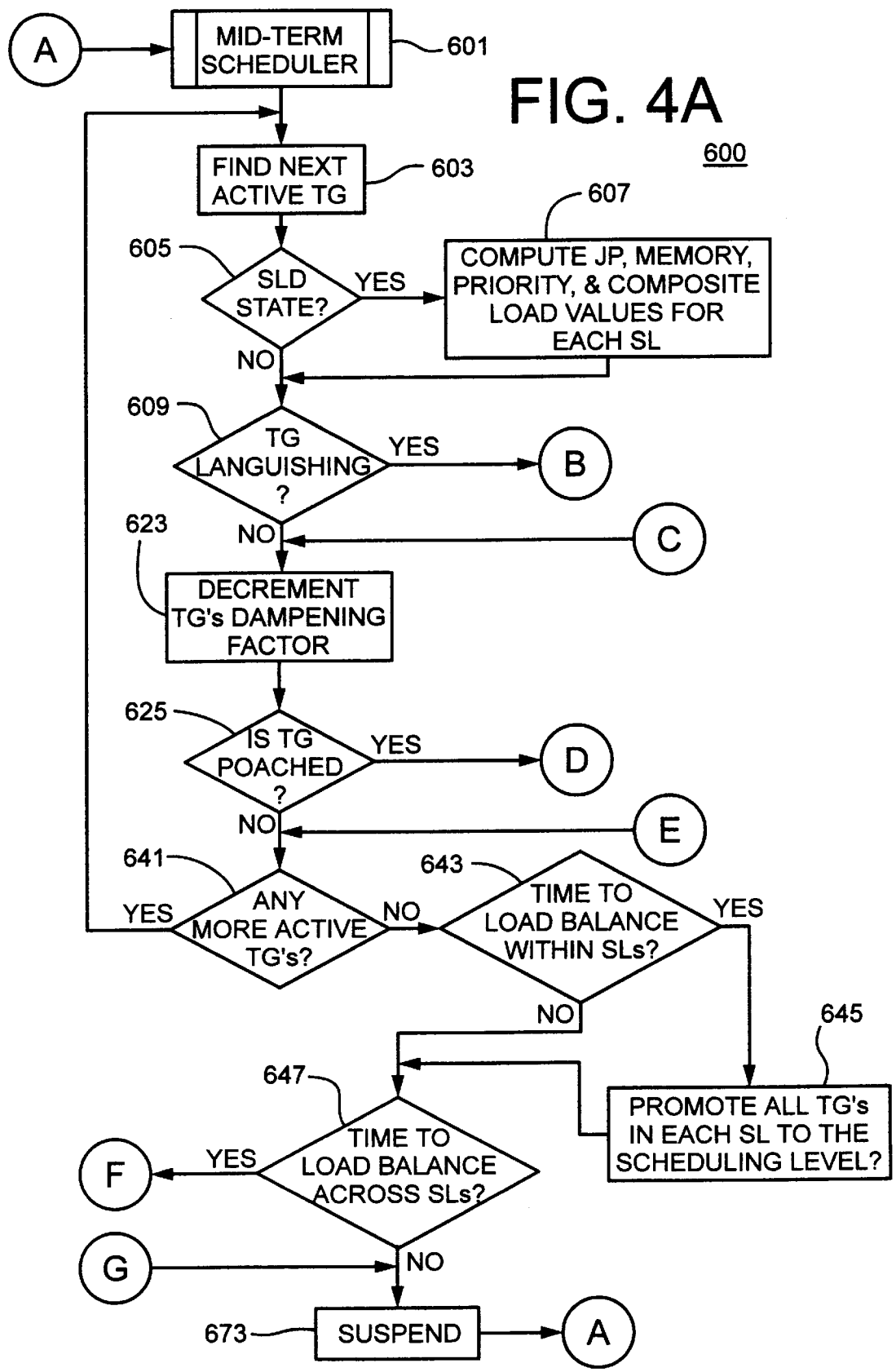
FIGS. 4A–4H are flowcharts of operations performed by a medium term scheduler constituting a part of the operating system of the present invention.
Figure 4B:
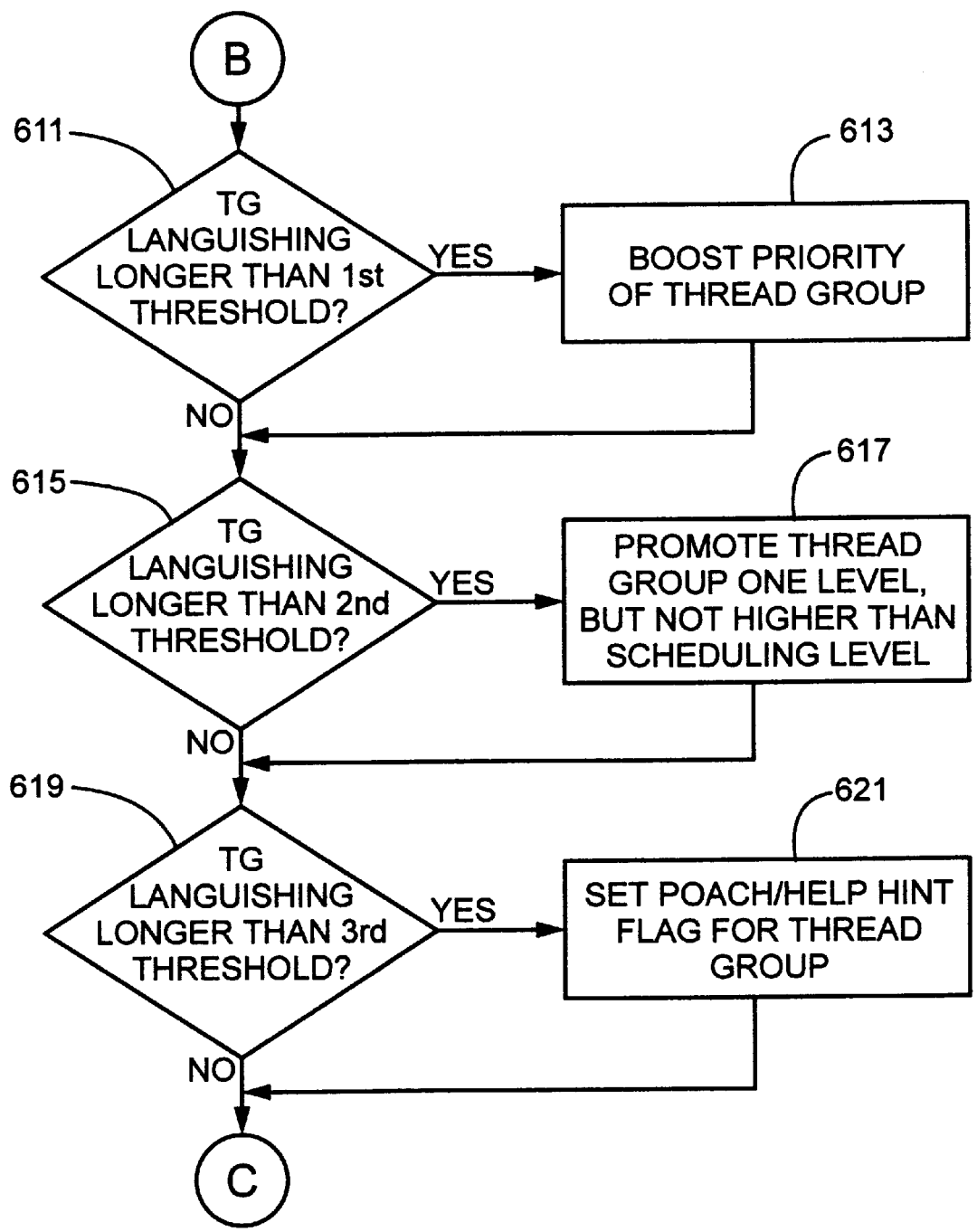
Figure 4C:
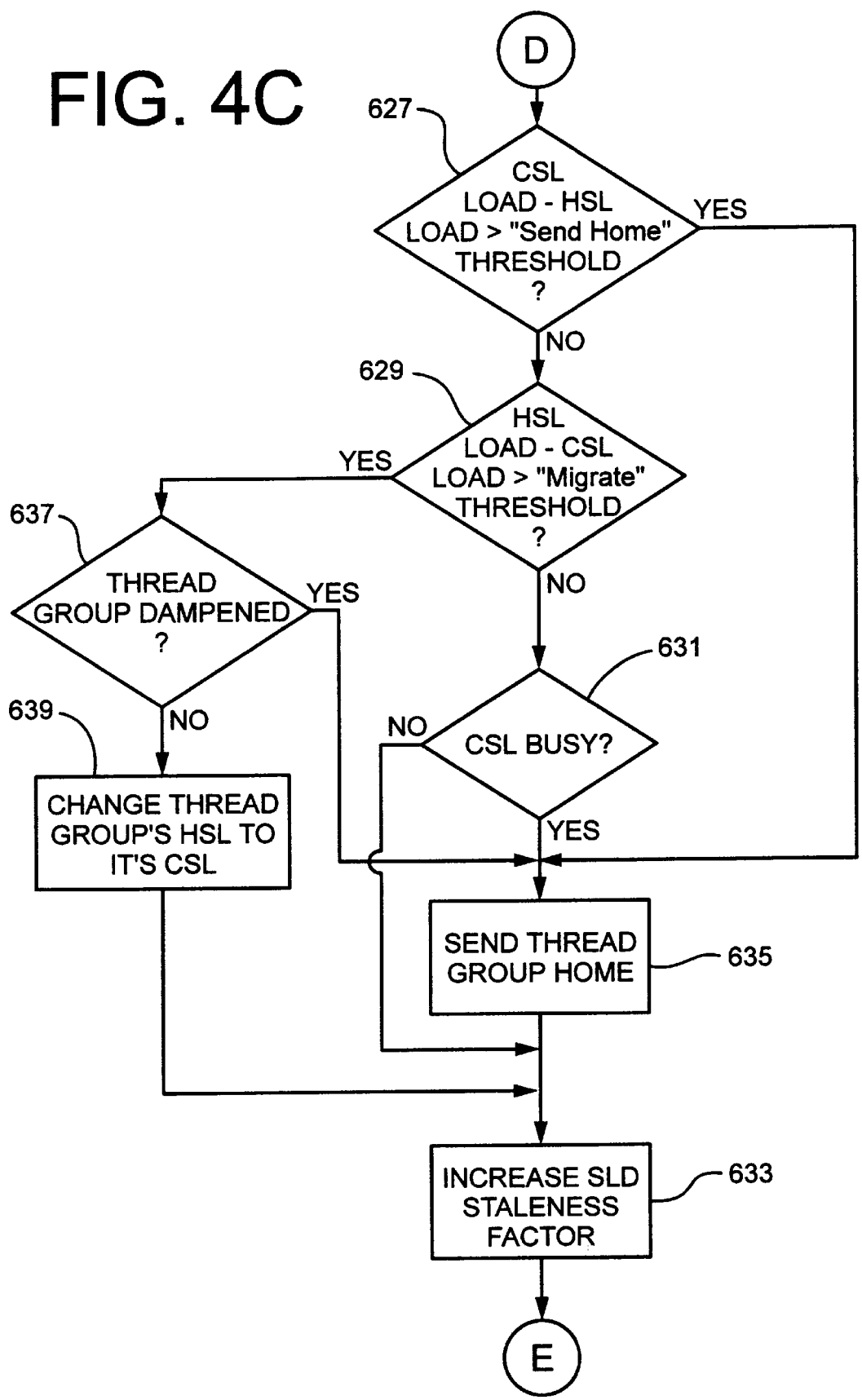
Figure 4D:
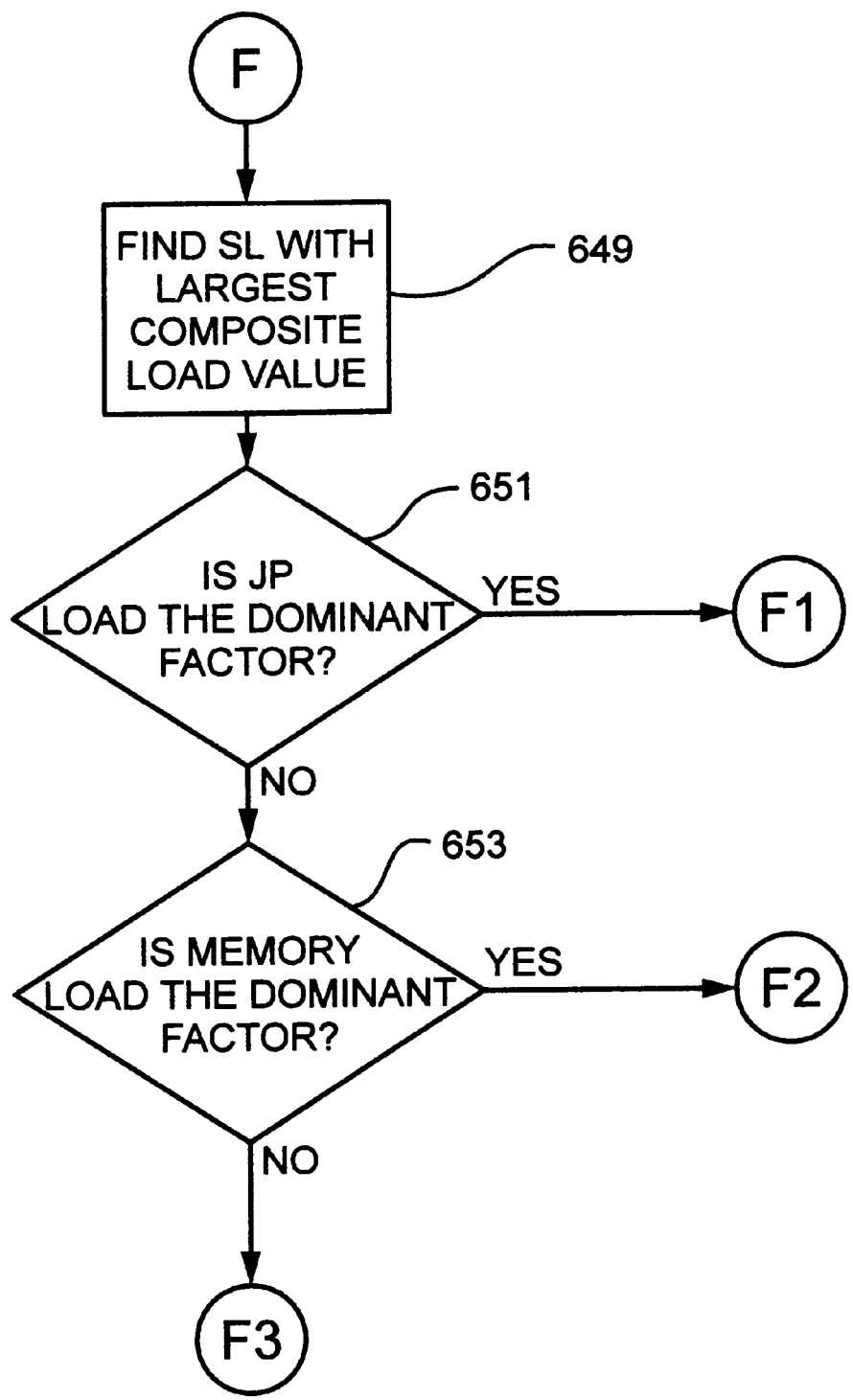
Figure 4E:
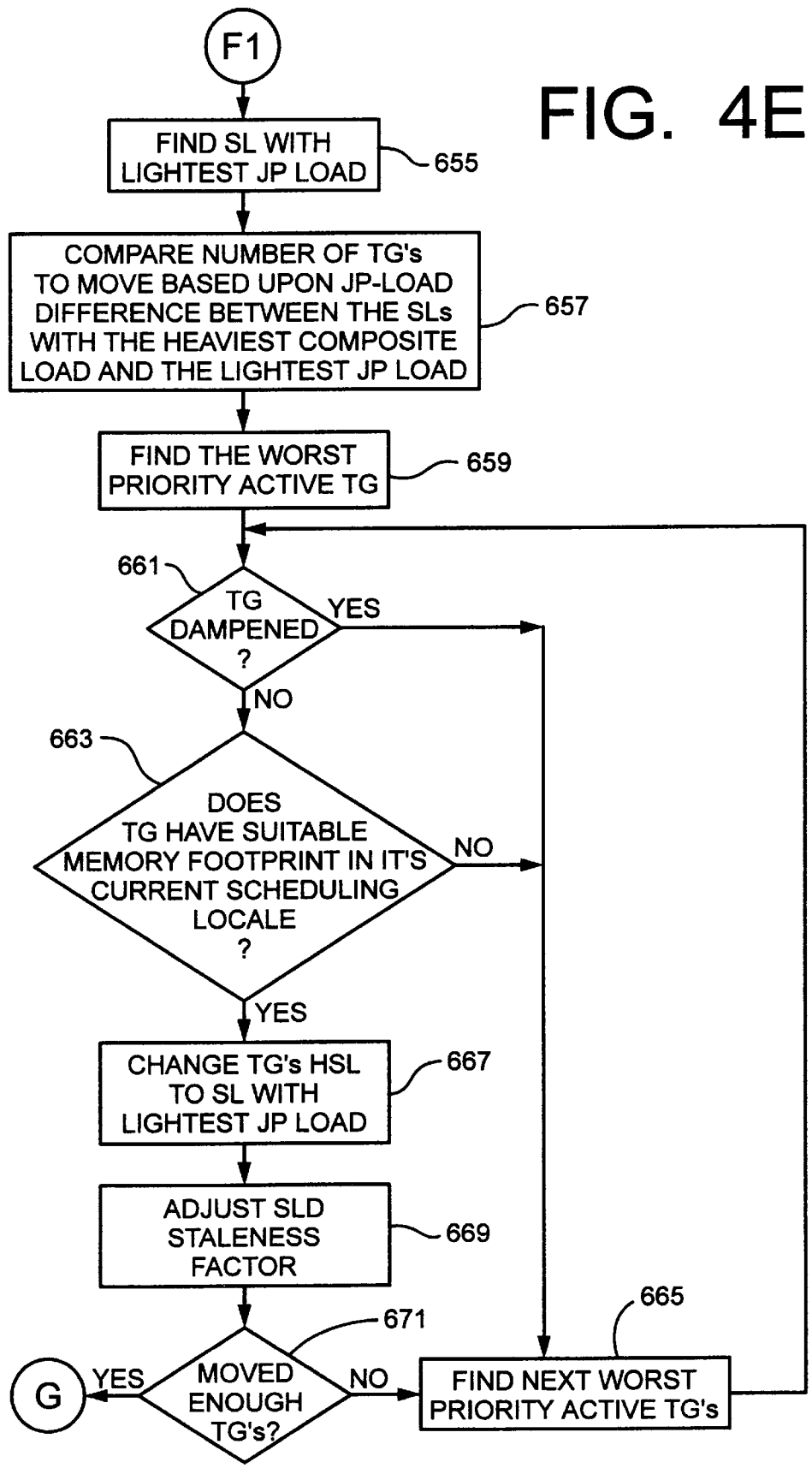

In the load balancing process shown in FIG. 4E, the medium term scheduler begins by finding the scheduling locale with the lightest JP load (step 655) and computing the number of thread groups to move based upon the JP load difference between the scheduling locales with the heaviest composite load and the lightest JP load (step 657). Next, the medium term scheduler finds the worst priority active thread group in the scheduling locale with the greatest composite load (step 659). If the thread group is not dampened (step 661), the medium term scheduler determines whether that thread group has a suitable memory "footprint" for migration (step 663).

A thread group's "footprint" in the memory of a given memory locale is a percentage of the amount of physical memory used by the thread group at that memory locale. What constitutes a suitable footprint for moving a thread group during JP load and priority load balancing will vary from system to system. A typical threshold may be, for example, thread groups having less than a 10 percent footprint in the physical memory of their current locale. By ensuring that any thread group to be moved has a suitable footprint, the medium term scheduler may prevent large thread groups from being moved during load balancing.

If the thread group is dampened or if the targeted thread group does not have a suitable memory footprint, the medium term scheduler finds the next worst priority thread group (step 665) and repeats the tests of steps 661 and 663 on the newly selected thread group. If the selected thread group is not dampened and the targeted thread group has a suitable memory footprint, the medium term scheduler migrates the thread group to the scheduling locale with the lightest JP load (step 667). Next, the medium term scheduler adjusts the SLD staleness factor (step 669) and determines whether it has moved the computed number of thread groups (step 671). If not enough thread groups have been moved, the medium term scheduler finds the next worst priority thread group (step 665) and repeats steps 661-671 until enough thread groups have been moved. Once the computed number of thread groups have been moved the medium term scheduler suspends operation for a predetermined time period (step 673, FIG. 4A) before repeating performing its assigned functions as described above.

Figure 4F:
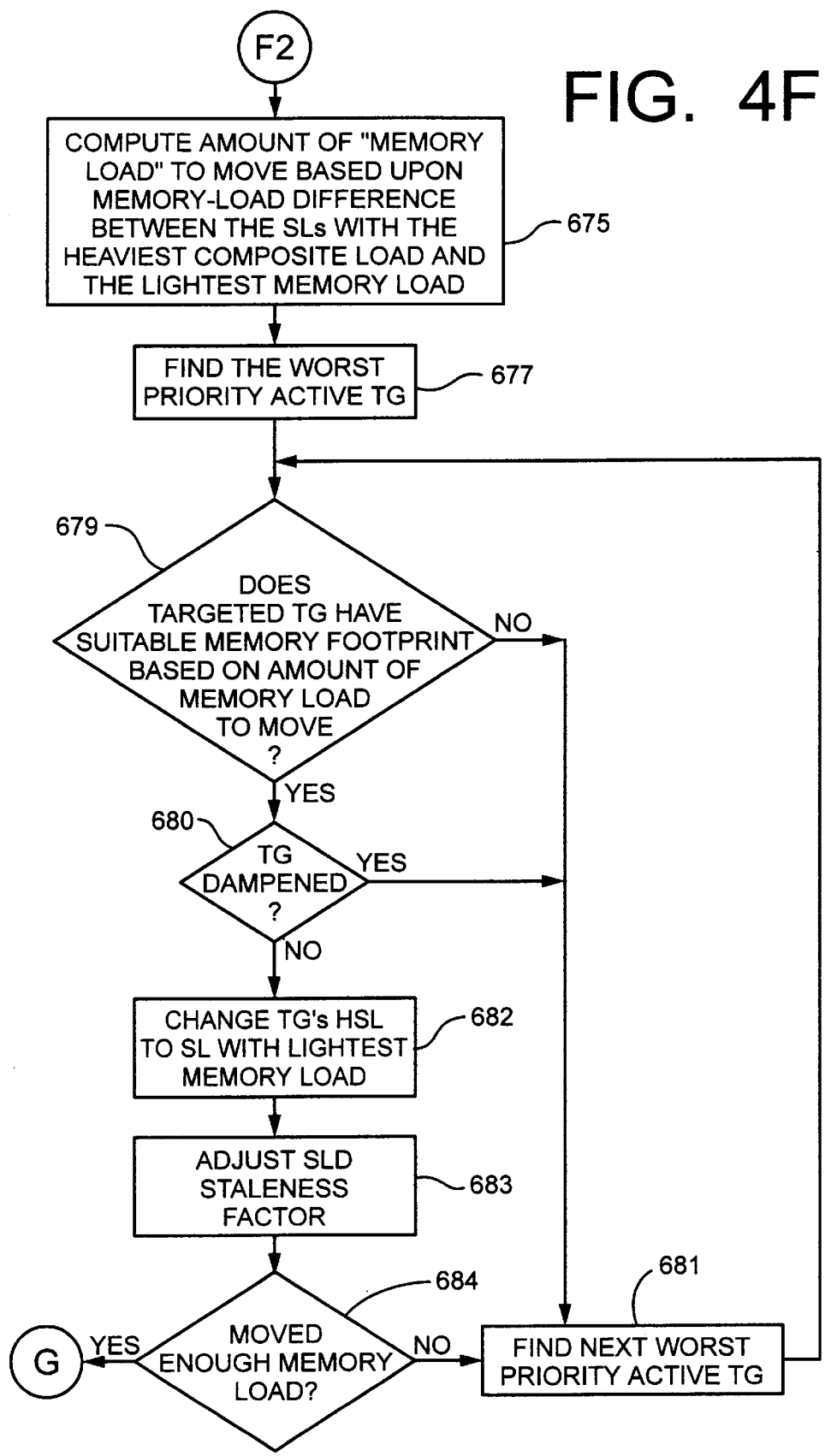

In the load balancing process shown in FIG. 4F, the medium term scheduler begins by computing the amount of memory load to move based upon the memory load difference between the scheduling locales with the heaviest composite load and the lightest memory load (step 675). Next, the medium term scheduler finds the worst priority active thread group in the scheduling locale with the greatest composite load (step 677). If the targeted thread group has a suitable memory footprint in its current locale for the amount of memory load to move (step 679), the medium term scheduler determines whether the thread group is dampened (step 680).

A suitable footprint for purposes of load balancing memory load will vary based upon the amount of memory that must be moved. For example, if 20 percent of the physical memory from one locale must be moved to another to balance memory load, thread groups having a footprint of 20 percent or less may be moved. If the thread group is dampened or if its footprint is unsuitable, the medium term scheduler finds the next worst priority thread group (step 681) and repeats the tests of steps 680 and 681 on the newly selected thread group.

If the selected thread group is not dampened and its footprint is suitable, the medium term scheduler migrates the thread group to the scheduling locale with the lightest memory load (step 682). Next, the medium term scheduler adjusts the SLD staleness factor (step 683) and determines whether it has moved the computed amount of memory load (step 684). If not enough memory load has been moved, the medium term scheduler finds the next worst priority thread group (step 681) and repeats steps 679–684 until enough memory load has been moved. Once the computed amount of memory load has been moved the medium term scheduler suspends operation for a predetermined time period (step 673, FIG. 4A) before repeating performing its assigned functions as described above.

Figure 4G:
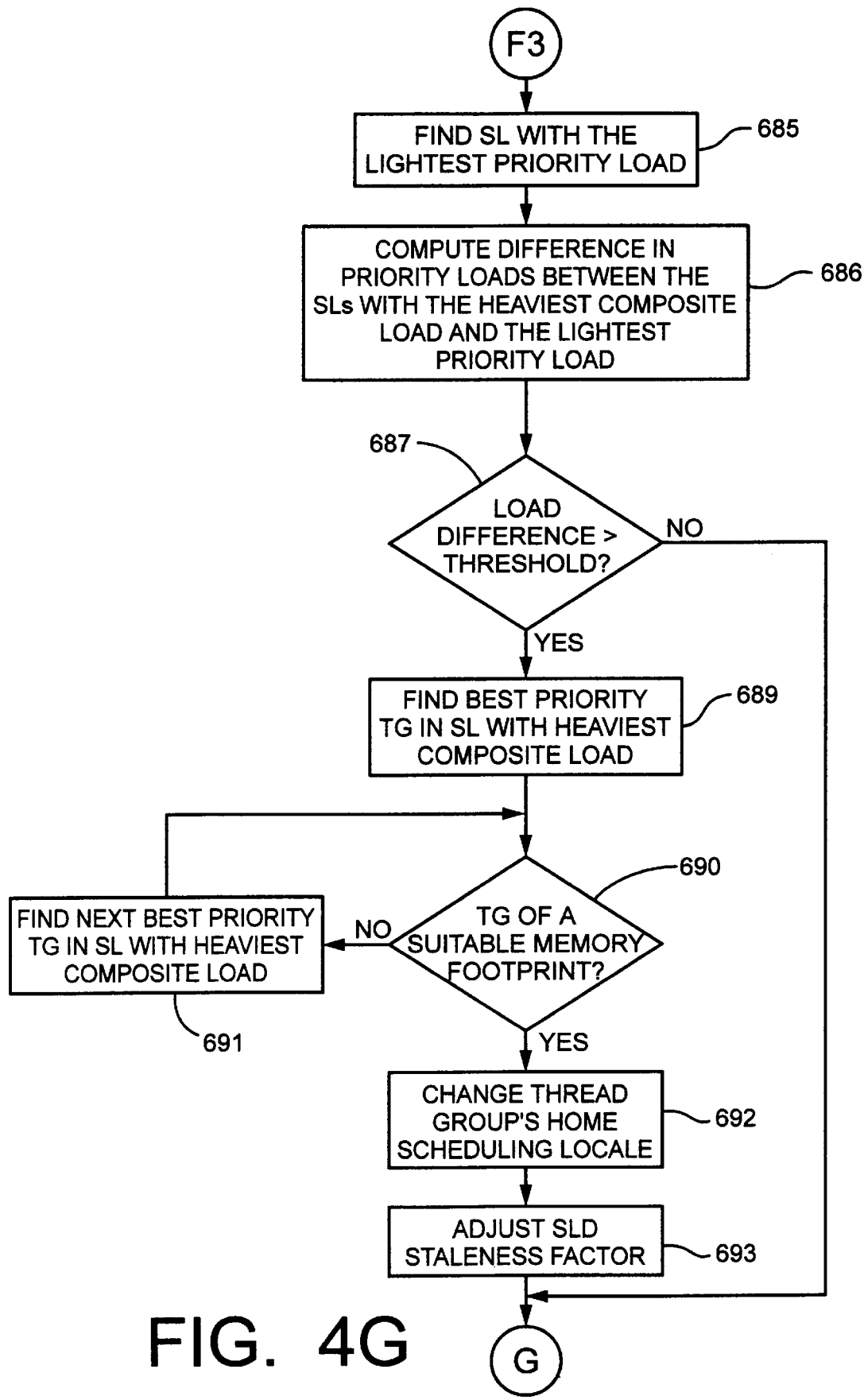

In the load balancing process shown in FIG. 4G, the medium term scheduler begins by finding the scheduling locale with the lightest priority load (step 685) and computing the difference in priority loads between the scheduling locales with the heaviest composite load and the lightest priority load (step 686). Next, the medium term scheduler determines whether the computed load difference exceeds a predetermined threshold (step 687). If it does not, the medium term scheduler does not perform load balancing. If the load difference does exceed the threshold level, the medium term scheduler finds the best priority thread group with the heaviest composite load (steps 689 and 691) having a suitable footprint in the scheduling locale (step 690) and migrates the thread group to the scheduling locale with the lightest priority load (step 692). Next, the medium term scheduler adjusts the SLD staleness factor (step 693) and suspends operation for a predetermined time period (step 673, FIG. 4A) before repeating performing its assigned functions as described above.

The medium term scheduler may also ensure a balanced processing load throughout the hierarchical tree by controlling the initial home-scheduling locale assignment of a thread group created by a UNIX Exec( ) command. For short-lived processes, the initial home-scheduling locale will be the only scheduling locale for the process. For long-lived processes, the initial home-scheduling locale will bias future performance since it is the home-scheduling locale that takes the process' page faults.

Figure 4H:
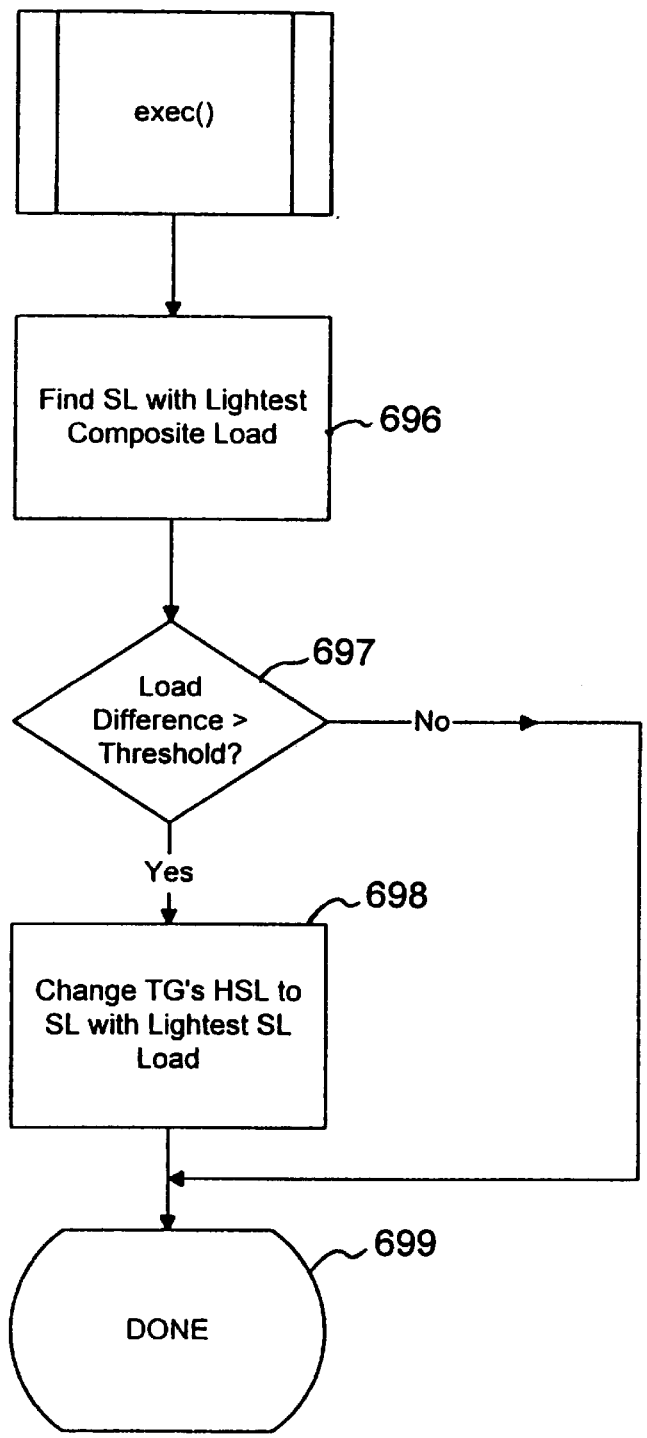

When a new process is created via a UNIX Fork( ) command, its thread group will inherit the home-scheduling locality of its parent since the home-scheduling locale represents the desired locality for the thread group. When a process performs a UNIX Exec( ) command, it overwrites its image and therefore has no relationship (except for shared memory) to its previous memory. In this case, it is desirable to assign the process a home-scheduling locale that will maximize JP resources and where memory resources are available. FIG. 4H shows the process performed to assign an Exec( ) process a home-scheduling locale. When an Exec( ) command is to be performed, the Process Control subsection of the kernel calls into the medium term scheduler subsystem, which then moves the calling task group's home-scheduling locale with the lightest composite load. First, the scheduling locale with the smallest composite load is identified (step 696). If the difference between the composite loads of the scheduling locale with the smallest load and the home-scheduling locale of the calling task group exceeds a threshold level (step 697), the thread group's home-scheduling locale is changed to the scheduling locale with the lightest composite load (step 698). Otherwise, the thread group inherits the home-scheduling locale of its parent process before the medium term scheduler subsystem returns control to the process control subsystem (the medium term scheduler is a separate kernel thread__ however, the Exec( ) command passes through the medium term scheduler subsystem under the caller's thread of control) (step 699).

Memory Management

Another consideration in a NUMA system that results from adjusting the affinity of a process to a JP, is the management of the system's memory resources. If a thread group is migrated, it may also be desirable to move the memory associated with that thread group. Additionally, the memory manager of a NUMA system preferably assigns page fault locations based upon the location of the faulting process and the type of information contained in the page. Further, the memory manager should maintain balanced usage of the systems memory resources.

Figure 5A:
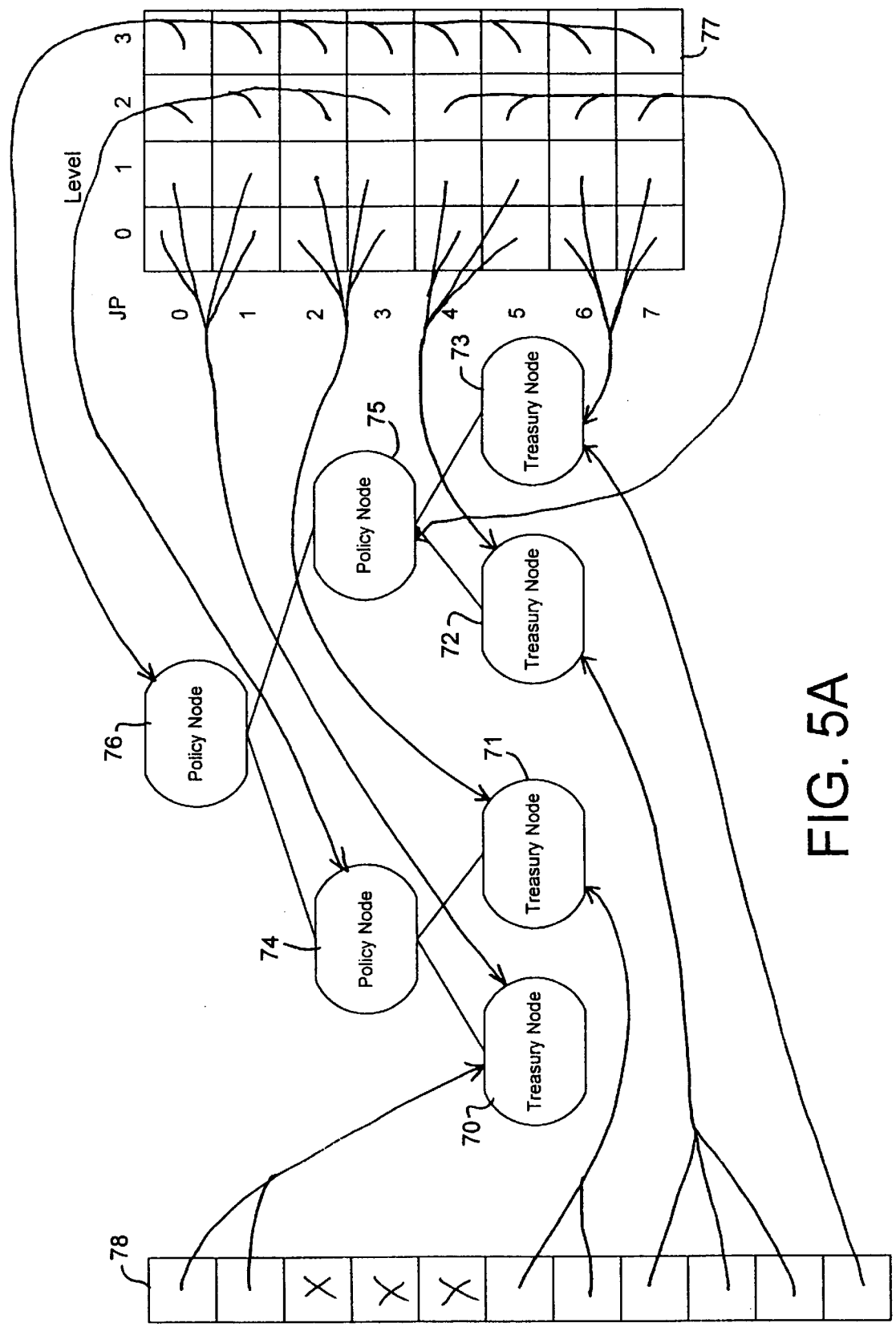
FIG. 5A is a block diagram illustrating a policy tree abstraction of the non-uniform memory access (NUMA) multiprocessor system shown in FIG. 1A and the associated linking data structures.
Figure 5B:
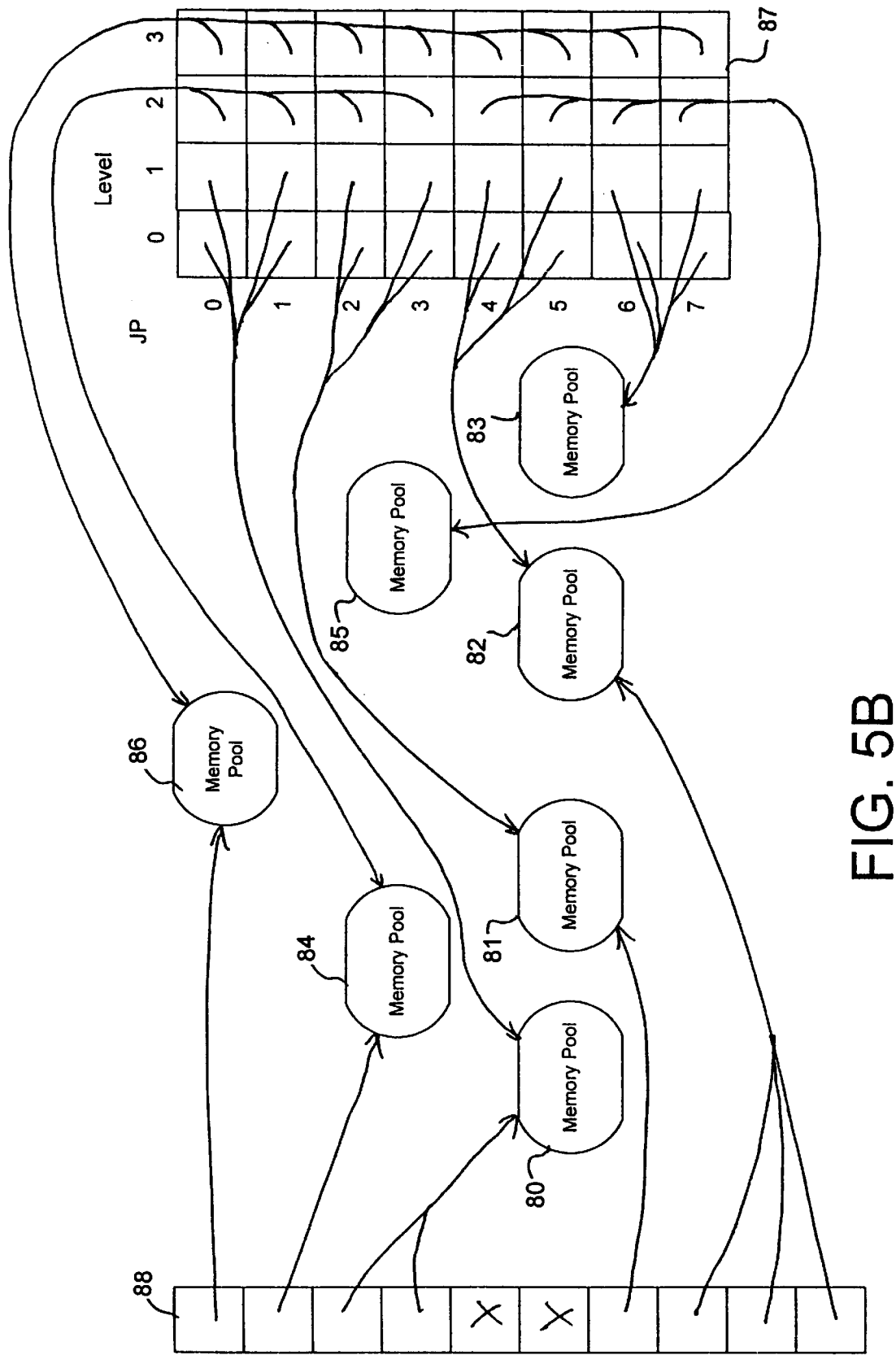
FIG. 5B is a block diagram illustrating a virtual memory abstraction of the non-uniform memory access (NUMA) multiprocessor system shown in FIG. 1A and the associated linking data structures.

To accomplish the above tasks, the operating system of the present invention includes a virtual memory manager that utilizes a system abstraction similar to that shown in FIG. 1B by instituting data structures representing a plurality of physical and virtual resources distributed through the system. The data structures take the form of various tables associated with various nodes of the abstracted system. FIGS. 5A and 5B show examples of these data structures as they would appear for a NUMA multiprocessor system such as that shown in FIG. 1A.

In a uniform memory access system, the memory consists of a block of physical memory that is equally accessible by all JPs at the same cost and with the same access time. However, in a NUMA system, the system's memory may consist of various blocks of distributed shared memory having different access times and costs. FIG. 5A shows an example of the system abstraction and data structures representing the allocation of a NUMA system's physical memory. The abstraction used by the virtual memory manager forms a policy tree including a treasury node 70–73 associated with each group of shared memory, and a high-level policy node 76 associated with the root locale node 120 of the hierarchical tree abstraction. Also, the policy tree abstraction may include intermediate policy nodes 74 and 75 associated with nodes 114 and 115 of the hierarchical tree abstraction. The treasury nodes represent a mechanism for allocating physical memory space in accordance with policies established by the policy nodes for the implementation of a page placement algorithm. The association of the policy and treasury nodes with the nodes of the hierarchical tree abstraction are maintained in a Locale-to-Node Look-up Table 77. The Locale-to-Node Look-up Table 77 is preferably a two-dimensional array designated by JP numbers on one axis and Level numbers on the other. For each JP and Level number designation, there exists a pointer to one of the policy or treasury nodes. In this manner, a treasury or policy node may be quickly identified using the same JP-Level nomenclature used by the scheduling elements of the operating system.

The system's physical memory is composed of discrete elements called "frames" whose size is determined by the underlying processor architecture, but is commonly 4 KB. The operating system divides the available physical memory into groups of, for example, 1024 contiguous frames, and these frame groups are then assigned to the treasuries in the system. This Assignment is maintained in a high level frame table 78. Each of these frames has a unique identification number that may be computed by dividing the frame's starting physical address by the frame size. Each frame, furthermore, is managed by one slot in the high level frame table 78, and this slot number can be computed by dividing the frame's unique identification number by the frame group size. Because the physical addresses of the physical memory in a NUMA system may not be contiguous, some of the frames identified in the High Level Frame Table 78 may not represent actual physical memory. In such a case, the High Level Frame Table 78 entry for such frames could be marked invalid.

As described in greater detail below, the treasuries manage and allocate the frames of physical memory at their locale using an associated memory frame table. The policy nodes are provided such that frames of physical memory to be allocated at a higher level node in the hierarchical tree abstraction may actually be allocated from the policy node's children treasury nodes in accordance with predetermined policy considerations associated with the policy node. Typically, these policies are selected to load balance such high level memory requests amongst the descendent memory groups. Thus, increasingly higher levels in a policy tree represent increasingly larger numbers of memory groups from which to allocate frames. The policy tree is traversed by a frame allocation routine which is invoked by a page fault handling routine when a frame is to be allocated to satisfy the fault. The frame allocator uses a page placement constraint to determine the memory locale from which to allocate a frame. The constraint identifies a policy node at which to begin applying the page placement algorithm. Traversal of the policy tree may begin at the root, leaf, or some intermediate level depending upon the constraint ascribed to the object page mapped by the logical address. The default constraint for any mapping is associated with the memory object. Default constraints are assigned to objects depending upon the attributes of the object.

The page placement algorithm begins traversal of the policy tree at a specified node and applies a level-dependent policy for each node it encounters until it has selected a frame treasury from which to allocate a frame. Weights may be used to compensate for disparities in the total number of frames distributed among sibling nodes at any given level of the tree. The data structures used for policy tree management consist of a policy node class enumeration and a link structure, which will be embedded in all types of policy nodes in a policy tree. Other information, specific to the particular type of node in the policy tree, may also be kept in the structure. The specific manner in which the treasury and policy nodes are utilized by the page placement algorithm and other memory allocation algorithms of the operating system of the present invention is described in greater detail below.

FIG. 5B shows an example of the system abstraction and data structures representing the allocation of a NUMA system's virtual (logical) memory. The abstraction used by the virtual memory manager includes a memory pool 80–86 associated with each node of the hierarchical tree abstraction. The association of the memory pools with the nodes of the hierarchical tree abstraction are maintained in a Locale-to-Node Look-up Table 87. The Locale-to-Node Look-up Table 87 is preferably a two-dimensional array designated by JP numbers on one axis and Level numbers on the other. For each JP and Level number designation, there exists a pointer to one of the memory pools. In this manner, a memory pool may be quickly identified using the same JP-Level nomenclature used by the scheduling elements of the operating system.

Additionally, the system may be capable of distinguishing unwired memory, which is a region of virtual memory that may be paged out of physical memory, from wired memory, which is a region of virtual memory that is forced to stay resident in physical memory. To accommodate these different types of memory regions, the operating system of the present invention may establish two types of memory pools at each node of the abstraction—one for wired memory and one for unwired memory. Although two different types of memory pools are not shown in FIG. 5B, the system may be readily modified to account for two or more different types of memory pools by creating similar parallel data structures in the system abstraction. Additionally, a special unwired memory pool, which is used for shared page table allocations, may be established for the root memory locale only. Further, other types of memory pools may be established at various locales in the abstraction to accommodate any type of distinction between memory resources that improves the efficiency of the system operation.

The system's virtual memory is divided into "pool units." The pool units have a predetermined constant size of 4 MB, for example, and correspond to one and only one virtual memory address range. Although the frame group size and the pool unit size are disclosed as being the same in this example, other frame and pool unit sizes may be selected that are not the same. Each of the pool units has a unique identification number that may be quickly computed by dividing the starting logical address of the pool unit by the pool unit size. The memory pools to which each of the pool units are assigned are maintained in a pool unit table 88. Because the logical addresses of the virtual memory in a NUMA system may be non-contiguous, some of the pool units identified in the pool unit table 88 may not represent assigned virtual memory. In such a case, the pool unit table 88 entry for such pool units would be marked invalid.

Figure 6A:
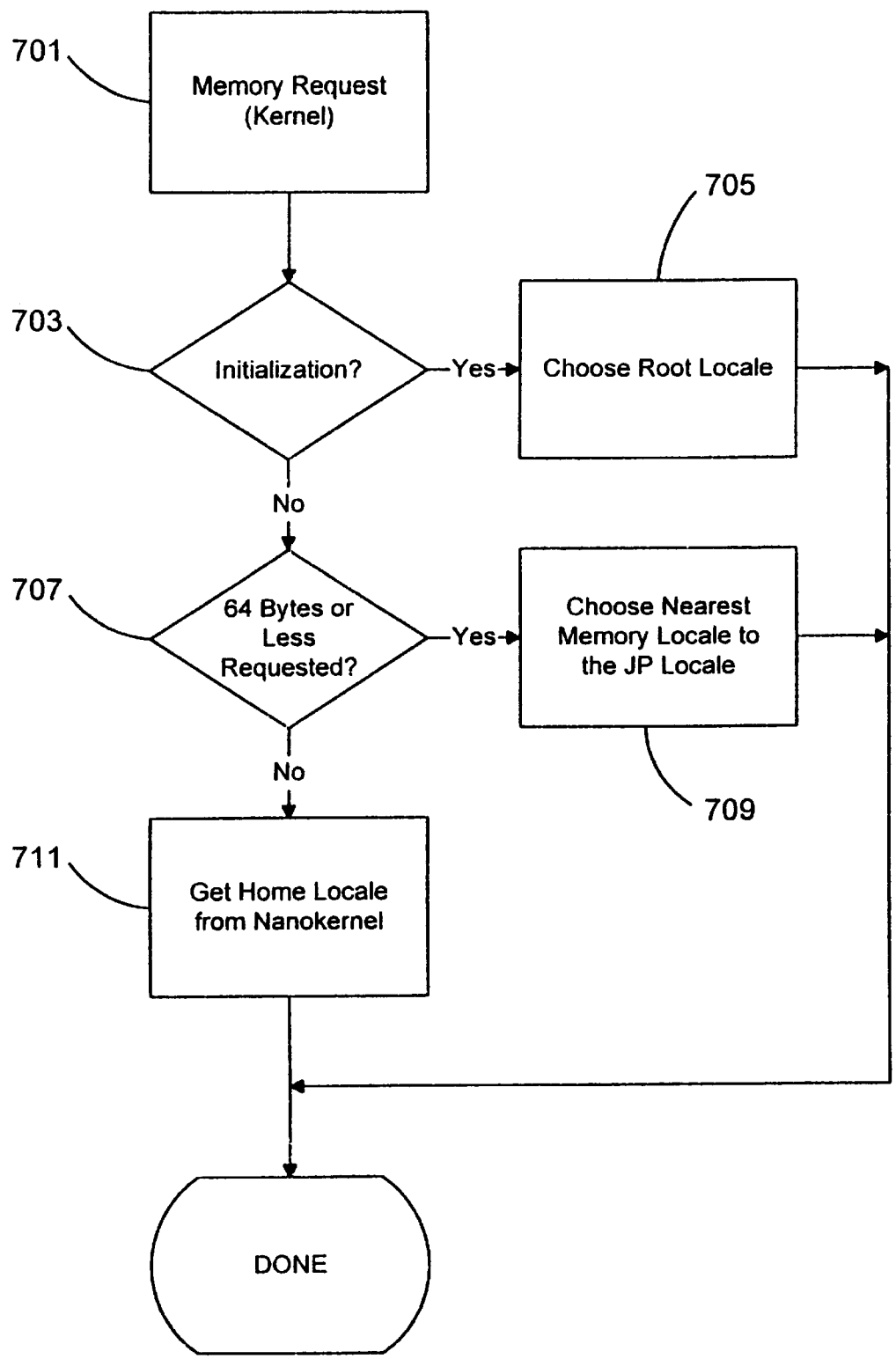
Figure 6B:
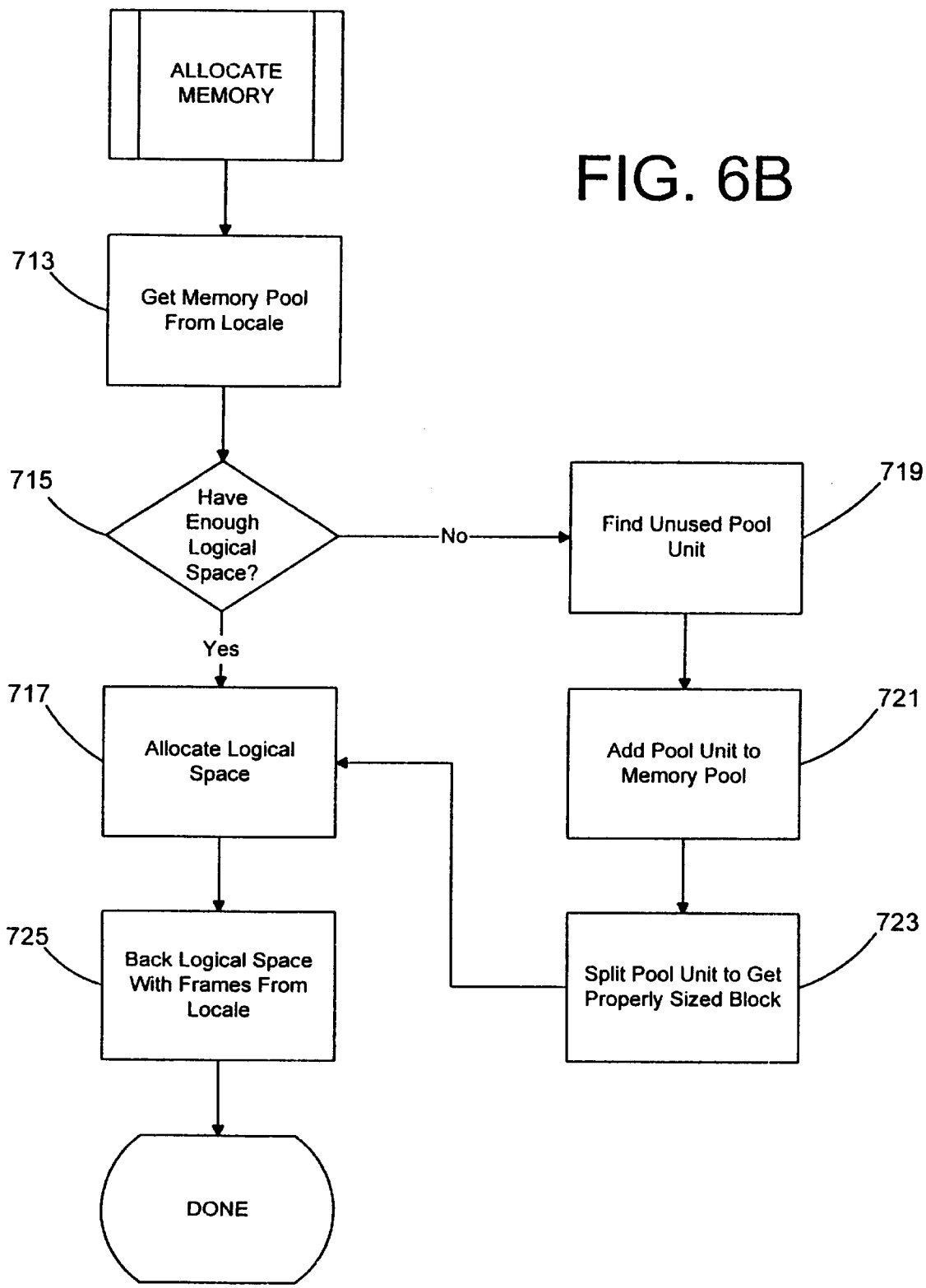
Figure 6C:
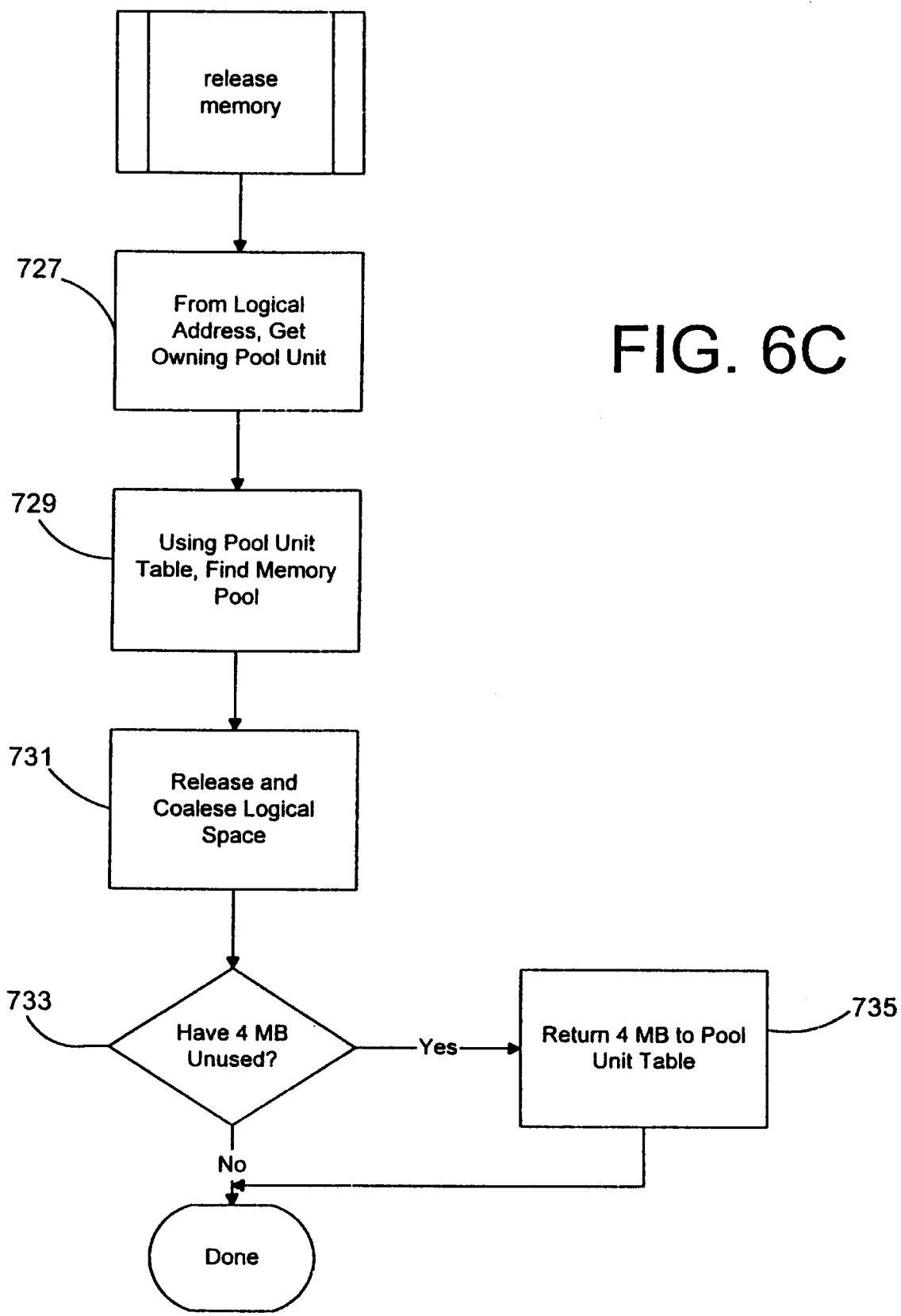

Initially, all the pool units are unassigned. The pool units are subsequently assigned to the memory pools as needed. In this manner, the pool units may be dynamically allocated across the system without fragmenting memory resources across many memory pools and without leading to artificial memory exhaustion problems as would be the case if the pool units were statically assigned at system initialization time. The manner by which the virtual memory manager handles a request for kernel memory is shown in FIGS. 6A–6C. When a memory request is made by a thread (step 701, FIG. 6A), the virtual memory manager determines whether the system is presently being initialized (step 703). If so, the virtual memory manager chooses to allocate virtual memory from the root locale 120 (step 705). If the system has been initialized, the virtual memory manager determines whether the amount of memory requested is small ($\leq 64$ Bytes) (step 707). If the amount of requested memory is small, the virtual memory manager chooses to allocate the memory from the memory locale closest to the JP executing the thread (step 709). If the requested amount of memory is not small, and a specific locale has not been requested the virtual memory manager obtains and selects the home-scheduling locale, which is the locale at which the thread's thread group is most closely affined, as described above (step 711).

After selecting a memory locale, the virtual memory manager uses the nomenclature for the selected memory locale to identify the memory pool associated therewith from the Locale-to-Node Look-up Table 87 (step 713). Once the memory pool is identified, the virtual memory manager checks whether the identified memory pool has enough logical space (step 715). If the identified memory pool has enough space, the virtual memory manager allocates logical space for the request (step 717). On the other hand, if the memory pool does not have enough logical space, the virtual memory manager finds unused pool units in the pool unit table 88 (step 719) and adds the pool unit to the identified memory pool (step 721). Then, if requested amount of memory is less than the size of the pool unit, the virtual memory manager splits the pool unit to obtain a block of memory having the requested amount of memory (step 723) prior to allocating the requested logical space (step 717). After allocating the logical space, the virtual memory manager backs the allocated logical space with frames from the designated memory locale or from one or more of its descendent memory locales if the designated locale is a policy node rather than a treasury node (step 725). Thus, using the above procedure, the virtual memory manager may ensure closest possible affinity between the process and the data which the process operates upon. For example, if a thread of a thread group affined to node 114 (FIG. 1B) (which may be the case if JPs 100 and 102 are both executing threads of the thread group) requests kernel memory, the virtual memory manager will select the node 114 memory locale, which is the locale at which the thread's thread group is most closely affined, and will identify the memory pool (84) associated with node 114 by looking up the memory pool corresponding to the (2,0) nomenclature representing node 114 in the Locale-to-Node Look-up Table 87. Then, the virtual memory manager allocates the logical memory space from the memory pool and backs the logical space with frames from any physical memory at locale 114 or with frames from its children memory locales 110 and 111 if there is no physical memory at node 114 (i.e., node 114 is a policy node). In the latter event, the manner by which the virtual memory manger will select one of memory locales 110 or 111 will depend upon the policy instituted at that particular policy node. It should be noted that each policy node may implement different policy considerations than other policy nodes. Such policies may be designed based upon hardware constraints and performance data of its children nodes. By allocating logical space from the memory pool associated with node 114 rather than from the memory pool(s) in which the frames are allotted to back-up the logical space, the allotted physical memory is more visible to both the threads executed on JPs 100 and 102. Further, the memory may subsequently be migrated from the physical memory in one of the memory locales 110 or 111 to that of the other memory locales 111 or 110 if the JP furthest from the physical memory subsequently accesses the data stored there more frequently than the closest JP.

As another example, if a thread of a thread group affined to JP 100 (FIG. 1B) requests kernel memory, the virtual memory manager would select the node 110 memory locale, allocate logical space from the memory pool associated with memory locale 110, and back that logical space with frames from the physical memory associated with memory locale 110.

When virtual memory is freed up for use, virtual memory manager looks at the starting logical address of the block of freed virtual memory and identifies the owning pool unit (step 727). Then, the virtual memory manager identifies which memory pool the pool unit is assigned to by accessing the pool unit table 88 (step 729). Next, the virtual memory manager releases and coalesces the logical space of the freed virtual memory to the identified memory pool (step 731). Subsequently, if the virtual memory manager determines in step 733 that a memory pool has an unused pool unit, it returns the pool unit to the pool unit table 88 (step 735) such that the pool unit may be assigned to other memory pools.

Figure 6D:
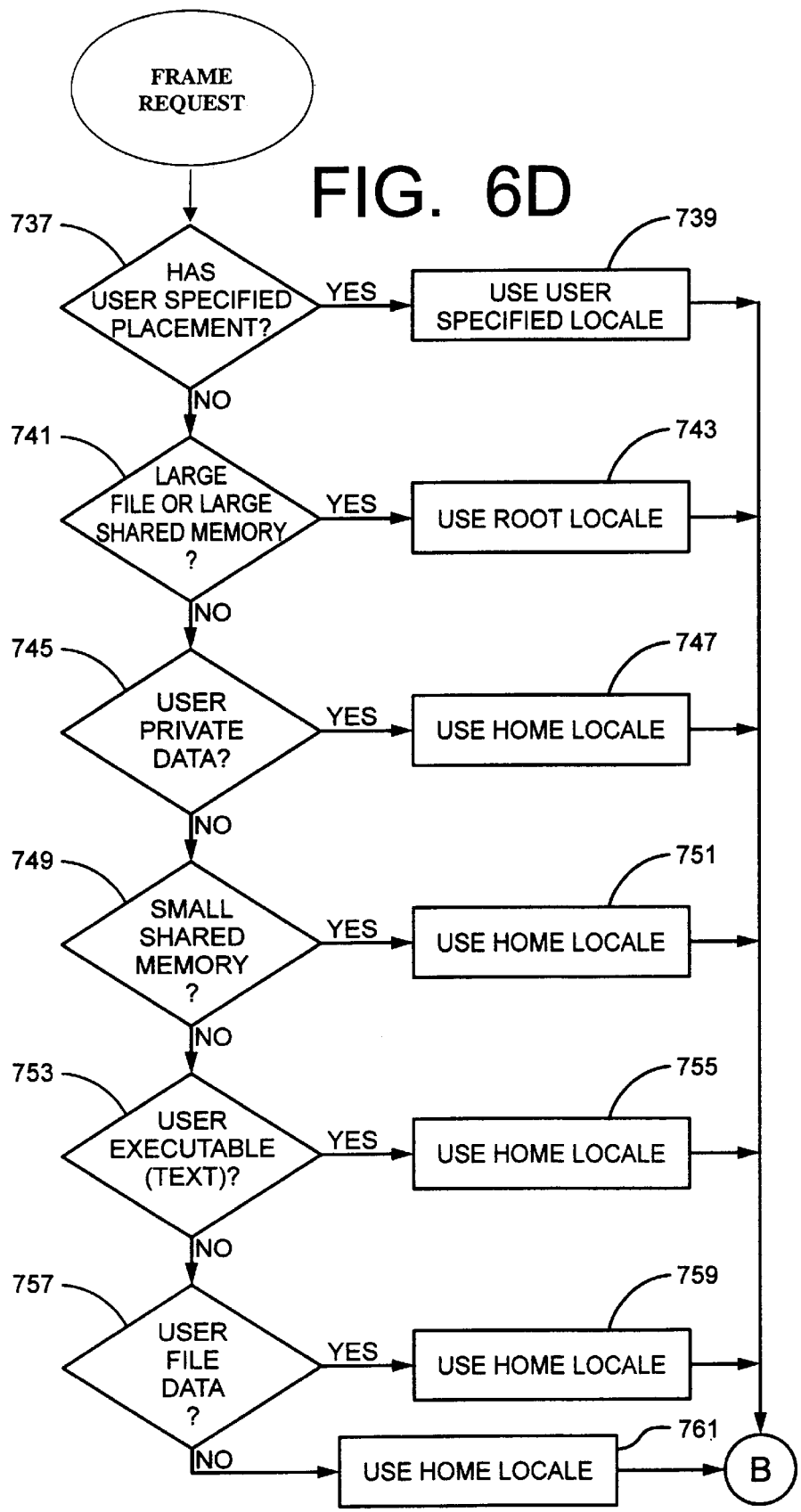

The manner in which the virtual memory manager 700 handles a frame request is shown in FIGS. 6D and 6E. When a page fault is made, a request for a frame of physical memory is also made and virtual memory manager 700 determines whether the user has specified the locale for the placement of the page (step 737). If the user has specified the locale, virtual memory manager 700 honors the request and designates the locale specified by the user (step 739). If the user has not specified the locale, the virtual memory manager checks whether the page fault is for a large file or large shared memory (step 741). If so, the virtual memory manager designates the root locale 120 (step 743). If the page fault is not for a large file or shared memory, the virtual memory manager determines whether the page fault is for user private data (step 745). If it is user private data, the virtual memory manager designates the home-scheduling locale to which the thread group of the requesting thread is most closely affined (step 747). Otherwise, the virtual memory manager determines whether the page fault is for shared memory (step 749). If it is shared memory, the virtual memory manager designates the home locale to which the thread group of the requesting thread is most closely affined (step 751). Otherwise, the virtual memory manager determines whether the page fault is for user executable text (i.e., program text) (step 753). If it is executable text, the virtual memory manager designates the home locale to which the thread group of the requesting thread is most closely affined (step 755). Otherwise, the virtual memory manager determines whether the page fault is for user file data (step 757). If it is user file data or, in this particular example, if it is not user file data, the virtual memory manager designates the home locale to which the thread group of the requesting thread is most closely affined (steps 759 and 761). Although the home locale is designated regardless of the outcome of the tests in steps 745–757, the designated locales may be varied for each test based upon the characteristics of the NUMA system implementing the operating system of the present invention.

After a locale is designated, the virtual memory manager identifies the physical memory node 70–76 (FIG. 5A) associated with that locale by looking it up in the Locale-to-Node Look-up Table 77 based upon the nomenclature identifying the locale (step 763, FIG. 6E). Next, the virtual memory manager determines whether the identified node is a treasury node or a policy node (step 765). If the node is a treasury node, implying that the locale represents a shared physical memory resource, the virtual memory manager selects a frame from the physical memory resource (step 767). If the node is not a treasury node, the virtual memory manager selects one of the node's children using a round-robin algorithm. If the selected node is a treasury, then the frame is allocated from that treasury. If the selected node is not a treasury, then one of its children is selected (round-robin), and the process is repeated.

In the procedure shown in FIG. 6E, steps 769–773 represent the policy of a policy node. These three steps may be replaced with any other algorithm for carrying out the desired policy considerations for any given policy node.

Memory may be migrated between the various nodes of the system abstraction to limit costs for accessing the data stored in the memory from the JP most frequently accessing the data. Preferably, any such memory migration should be address transparent. Address transparent memory migrations are those where the logical address remains constant but the physical address changes. Transparency is accomplished through the use of page tables and hardware address translation. The use of the pool unit table 88 provides easy logical address to memory pool translations.

Memory is transparently migratable only among the memory locales that are descendants of the target locale (i.e., the locale to which the logical address is assigned). Hence, the target locale controls the degree of freedom in migration. The initial physical placement will occur from descendants of the target locale. The locale chosen for initial physical placement is referred to as the initial locale. Thus, referring to FIG. 1B, memory targeted for locale (2,0) might have an initial locale (1,0) and would be permitted to migrate only between locales (1,0), (1,1), (1,2), and (1,3). Although targeting the root memory locale is advantageous for permitting the greatest degree of migration, it decreases the affinity of the memory with the JPs accessing the data stored in the memory.

The operating system of the present invention additionally preferably includes a purger thread and cleaner thread for each treasury of the abstracted system. A purger thread implements the frame or the page replacement policy when the physical memory is simply too full. A cleaner thread takes modified file data and automatically writes the data back to disk at predetermined intervals to protect the data against a system crash. By providing a separate purger and cleaner at each node, no single purger or cleaner kernel thread has to be relied upon to perform its tasks across the whole system. Further, the system is more readily scalable and purgers and cleaners will exhibit better affinity.

Another way to increase the affinity between processors and the data they utilize, is to permit certain types of file pages to be replicated in multiple treasuries in the system. Because some types of file pages, such as those mapped shared read-write, cannot be replicated, the operating system must be capable of determining how each file page is mapped and implement a replication algorithm that takes into account the type of mapping for each file page. For example, a private, read-execute mapping of a file is most commonly used to map program text for an executable. Executable mappings are commonly shared among multiple processes, thus, the virtual memory manager may aggressively attempt to replicate such pages in the memory locale to which the faulting thread group is affined. Such replication could happen whenever a page fault is taken on a read-execute mapping of a program file provided the file cannot possibly be modified.

If the resident size of a file grows past some limit, then the file pages may be load balanced as they are brought into memory, as opposed to being placed according to the memory locale affined to the faulting thread group. In this way, the system can avoid saturating one memory locale with pages from a particular file.

The invention may be implemented in other specific forms without departing from the spirit or essential characteristics thereof. For example, while a system having three levels of run queues has been discussed above, it will be understood that the same concepts can be readily extended to systems organized with more than three processing levels. Further, although the present invention has been described with examples operating on thread groups, the operating system may operate on single processes (threads) as well. The scope of the invention is indicated by the appended claims rather than by the foregoing description and all changes within the meaning and range of equivalency of the claims are intended to be embraced therein.

What is claimed is:

1. A computer-readable medium containing program code embodying an operating system for a multiprocessor system having a hardware architecture including a plurality of processors for executing various processes, and a plurality of shared resources each accessible to each of the processors at an access expense which is different for some of the processors than for other of the processors, the operating system performing a method comprising the steps of:

maintaining an abstraction of the hardware architecture of the multiprocessor system, the abstraction representing the physical arrangement of the processors and the shared resources in the form of a hierarchical tree structure having a plurality of leaf nodes corresponding to the processors and located at the lowest level of the hierarchical tree, a root node corresponding to a common resource shared by all of the processors and shared resources and located at the highest level of the hierarchical tree, and a plurality of intermediate nodes corresponding to the shared resources and located in at least one intermediate level of the hierarchical tree;

establishing a run queue for each node of the hierarchical tree, each run queue that is associated with a leaf node identifying the active processes affined to the associated processor and each run queue that is associated with one of the remaining nodes identifying the active processes affined to groups of the processors that share the resource associated with the node; and monitoring the activity of the processors and selecting processes queued in the run queues for the processors to execute.

2. An operating system for a multiprocessor system having a hardware architecture including a plurality of processors for executing threads of various active thread groups, and a plurality of shared resources each accessible to each of the processors at an access expense which is different for some of the processors than for other of the processors, the operating system comprising:

means for maintaining an abstraction of the hardware architecture of the multiprocessor system, the abstraction representing the physical arrangement of the processors and the shared resources in the form of a hierarchical tree structure having a plurality of leaf nodes corresponding to the processors and located at the lowest level of the hierarchical tree, a root node corresponding to a common resource shared by all of the processors and shared resources and located at the highest level of the hierarchical tree, and a plurality of intermediate nodes corresponding to the shared resources and located in at least one intermediate level of the hierarchical tree;

means for establishing a run queue for each node of the hierarchical tree, each run queue that is associated with a leaf node identifying the active thread groups affined to the associated processor and each run queue that is associated with one of the remaining nodes identifying the active thread groups affined to groups of the processors that share the resource associated with the node; and means for monitoring the activity of the processors and selecting threads from the thread groups queued in the run queues for the processors to execute.

3. The operating system as defined in claim 2, wherein said monitoring means includes a plurality of dispatchers, each associated with one of said processors.

4. The operating system as defined in claim 3, wherein, when a processor has run out of threads to execute, the dispatcher associated therewith first checks for an available thread group in the run queues of ancestor nodes of the node corresponding to the processor that has run out of threads to execute.

5. The operating system as defined in claim 4, wherein if the associated dispatcher has failed to locate an available thread group in the ancestor node run queues within a first predetermined time period, the associated dispatcher additionally checks for an available thread group in the run queues of relative nodes of the node corresponding to the processor that has run out of threads to execute.

6. The operating system as defined in claim 5, wherein if the associated dispatcher has failed to locate an available thread group in the relative node run queues within a second predetermined time period, the associated dispatcher additionally checks for an available thread group in the run queues of all of the nodes of the hierarchical tree structure.

7. An operating system for a multiprocessor system having a hardware architecture including a plurality of processors for executing various processes, and a plurality of shared resources each accessible to each of the processors at an access expense which is different for some of the processors than for other of the processors, the operating system comprising:

means for maintaining an abstraction of the hardware architecture of the multiprocessor system, the abstraction representing the physical arrangement of the processors and the shared resources in the form of a hierarchical tree structure having a plurality of leaf nodes corresponding to the processors and located at the lowest level of the hierarchical tree, a root node corresponding to a common resource shared by all of the processors and shared resources and located at the highest level of the hierarchical tree, and a plurality of intermediate nodes corresponding to the shared resources and located in at least one intermediate level of the hierarchical tree; and means for monitoring the progress of the active processes at each node in the system and for increasing the likelihood that any process that was not progressing will be executed sooner.

8. The operating system as defined in claim 7 and further including:

means for establishing a run queue for each node of the hierarchical tree, each run queue that is associated with a leaf node identifying the active processes affined to the associated processor and each run queue that is associated with one of the remaining nodes identifying the active processes affined to groups of the processors that share the resource associated with the node; and means for monitoring the activity of the processors and selecting processes queued in the run queues for the processors to execute.

9. An operating system for a multiprocessor system having a hardware architecture including a plurality of processors for executing active processes and a plurality of shared resources each accessible to each of the processors at an access expense which is different for some of the processors than for other of the processors, the operating system comprising:

means for maintaining an abstraction of the hardware architecture of the multiprocessor system, the abstraction representing the physical arrangement of the processors and the shared resources in the form of a hierarchical tree structure having a plurality of leaf nodes corresponding to the processors and located at the lowest level of the hierarchical tree, a root node corresponding to a common resource shared by all of the processors and shared resources and located at the highest level of the hierarchical tree, and a plurality of intermediate nodes corresponding to the shared resources and located in at least one intermediate level of the hierarchical tree;

means for establishing a run queue for each node of the hierarchical tree, each run queue that is associated with a leaf node identifying the active processes affined to the associated processor and each run queue that is associated with one of the remaining nodes identifying the active processes affined to groups of the processors that share the resource associated with the node;

a plurality of dispatchers, each dispatcher associated with one of the processors for monitoring the run queue of the associated processor, looking for and obtaining processes from the run queues of other processors for the associated processor to execute; and a medium term scheduler for monitoring the progress of active processes in the system and for setting a flag for those processes that are not progressing, wherein, when one said dispatcher finds a run queue having a plurality of available processes, that dispatcher selects a process having its flag set.

10. The operating system as defined in claim 9, wherein said processes include thread groups and said dispatcher selects the thread group having the highest priority when none of the plurality of available thread groups have their flag set.

11. A method for selecting thread groups to execute in a multiprocessor system having a hardware architecture including a plurality of processors for executing thread groups and a plurality of shared resources each accessible to each of the processors at an access expense which is different for some of the processors than for other of the processors, the method comprising the steps of:

maintaining an abstraction of the hardware architecture of the multiprocessor system, the abstraction representing the physical arrangement of the processors and the shared resources in the form of a hierarchical tree structure having a plurality of leaf nodes corresponding to the processors and located at the lowest level of the hierarchical tree, a root node corresponding to a common resource shared by all of the processors and shared resources and located at the highest level of the hierarchical tree, and a plurality of intermediate nodes corresponding to the shared resources and located in at least one intermediate level of the hierarchical tree;

establishing a run queue for each node of the hierarchical tree, each run queue that is associated with a leaf node identifying the thread groups affined to the associated processor and each run queue that is associated with one of the remaining nodes identifying the thread groups affined to groups of the processors that share the resource associated with the node;

monitoring the run queue of each processor;

looking for and obtaining thread groups from the run queues of other processors for a processor to execute, each thread group having a priority assigned to it;

monitoring the progress of active thread groups in the system and setting a flag for those thread groups that are not progressing; and selecting a thread group having its flag set when the run queue in which the thread group is located has a plurality of available thread groups, and selecting a thread group having the highest priority if none of the thread groups have their flag set.

12. An operating system for a multiprocessor system having a hardware architecture including a plurality of processors for executing processes, and a plurality of shared resources each accessible to each of the processors at an access expense which is different for some of the processors than for other of the processors, the operating system comprising:

means for maintaining an abstraction of the hardware architecture of the multiprocessor system, the abstraction representing the physical arrangement of the processors and the shared resources in the form of a hierarchical tree structure having a plurality of leaf nodes corresponding to the processors and located at the lowest level of the hierarchical tree, a root node corresponding to a common resource shared by all of the processors and shared resources and located at the highest level of the hierarchical tree, and a plurality of intermediate nodes corresponding to the shared resources and located in at least one intermediate level of the hierarchical tree; and means for establishing a run queue for each node of the hierarchical tree, each run queue that is associated with a leaf node identifying the active processes affined to the associated processor and each run queue that is associated with one of the remaining nodes identifying the active processes affined to groups of the processors that share the resource associated with the node, wherein said abstraction defines one of the levels of the hierarchical tree as a scheduling level and identifying the nodes within the scheduling level as scheduling locales, wherein each active process within the multiprocessor system has a home-scheduling locale and a current-scheduling locale each corresponding to one of the scheduling locales, the home-scheduling locale of a process being the scheduling locale that is the ancestor of the preferred processor for executing the process and the current-scheduling locale of a process being the scheduling locale that is the ancestor of the processor that last executed the process.

13. The operating system as defined in claim 12 and further including:

a medium term scheduler for monitoring processing loads for each of said scheduling locales, determining, for each active process in the system, whether the process' home-scheduling locale and current-scheduling locale correspond to different scheduling locales, and for determining whether to move the thread process' home-scheduling locale to the process' current-scheduling locale, or to move the process' current-scheduling locale to the process' home-scheduling locale based upon the processing loads of said scheduling locales.

14. A method for maintaining balanced processor loads in a multiprocessor system having a hardware architecture including a plurality of processors for executing active processes, and a plurality of shared resources each accessible to each of the processors at an access expense which is different for some of the processors than for other of the processors, the method comprising the steps of:

maintaining an abstraction of the hardware architecture of the multiprocessor system, the abstraction representing the physical arrangement of the processors and the shared resources in the form of a hierarchical tree structure having a plurality of leaf nodes corresponding to the processors and located at the lowest level of the hierarchical tree, a root node corresponding to a common resource shared by all of the processors and shared resources and located at the highest level of the hierarchical tree, and a plurality of intermediate nodes corresponding to the shared resources and located in at least one intermediate level of the hierarchical tree;

establishing a run queue for each node of the hierarchical tree, each run queue that is associated with a leaf node identifying the active processes affined to the associated processor and each run queue that is associated with one of the remaining nodes identifying the active processes affined to groups of the processors that share the resource associated with the node, wherein said abstraction defines one of the levels of the hierarchical tree as a scheduling level and identifying the nodes within the scheduling level as scheduling locales, wherein each active process within the multiprocessor system has a home-scheduling locale and a current-scheduling locale each corresponding to one of the scheduling locales, the home-scheduling locale of a process being the scheduling locale that is the ancestor of the preferred processor for executing the process and the current-scheduling locale of a process being the scheduling locale that is the ancestor of the processor that last executed the process;

monitoring processing loads for each of said scheduling locales;

determining, for each active process in the system, whether the process' home-scheduling locale and current-scheduling locale correspond to different scheduling locales; and determining whether to move the process' home-scheduling locale to the thread group's current-scheduling locale, or to move the process' current-scheduling locale to the process' home-scheduling locale based upon the processing loads of said scheduling locales.

15. An operating system for a multiprocessor system having a hardware architecture including a plurality of processors for executing active processes, and a plurality of shared resources each accessible to each of the processors at an access expense which is different for some of the processors than for other of the processors, the operating system comprising:

means for maintaining an abstraction of the hardware architecture of the multiprocessor system, the abstraction representing the physical arrangement of the processors and the shared resources in the form of a hierarchical tree structure having a plurality of leaf nodes corresponding to the processors and located at the lowest level of the hierarchical tree, a root node corresponding to a common resource shared by all of the processors and shared resources and located at the highest level of the hierarchical tree, and a plurality of intermediate nodes corresponding to the shared resources and located in at least one intermediate level of the hierarchical tree;

means for establishing a run queue for each node of the hierarchical tree, each run queue that is associated with a leaf node identifying the active processes affined to the associated processor and each run queue that is associated with one of the remaining nodes identifying the active processes affined to groups of the processors that share the resource associated with the node; and a medium term scheduler for monitoring progression of each active process in the system, and for promoting each active process that has not progressed within a predetermined time period to a run queue of a higher level node in the hierarchical tree.

16. The operating system as defined in claim 15 and further including:

at least one dispatcher associated with one of said processors for monitoring the run queue for the associated processor and selecting the highest priority active process in the run queue for execution by the associated processor, wherein said medium term scheduler boosts a priority of each active process that has not progressed within a second predetermined time period.

17. The operating system as defined in claim 16, wherein:

said medium term scheduler sets a flag for each process that has not progressed within a third predetermined time period, said dispatcher monitors the run queue of the associated processor and looks for and obtains processes from the run queues of other processors for the associated processor to execute, and when said dispatcher finds a run queue having a plurality of available processes, said dispatcher selects a process having its flag set.

18. A method for maintaining balanced processor loads in a multiprocessor system having a hardware architecture including a plurality of processors for executing various active processes, and a plurality of shared resources each accessible to each of the processors at an access expense which is different for some of the processors than for other of the processors, the method comprising the steps of:

maintaining an abstraction of the hardware architecture of the multiprocessor system, the abstraction representing the physical arrangement of the processors and the shared resources in the form of a hierarchical tree structure having a plurality of leaf nodes corresponding to the processors and located at the lowest level of the hierarchical tree, a root node corresponding to a common resource shared by all of the processors and shared resources and located at the highest level of the hierarchical tree, and a plurality of intermediate nodes corresponding to the shared resources and located in at least one intermediate level of the hierarchical tree;

establishing a run queue for each node of the hierarchical tree, each run queue that is associated with a leaf node identifying the active processes affined to the associated processor and each run queue that is associated with one of the remaining nodes identifying the active processes affined to groups of the processors that share the resource associated with the node;

monitoring progression of each active process in the system; and promoting each active process that has not progressed within a predetermined time period to a run queue of a higher level node in the hierarchical tree.

19. An operating system for a multiprocessor system having a hardware architecture including a plurality of processors, and a plurality of shared memory resources each accessible to each of the processors at an access expense which is different for some of the processors than for other of the processors, the operating system comprising:

means for maintaining an abstraction of the hardware architecture of the multiprocessor system, the abstraction representing the physical arrangement of the processors and the shared memory resources in the form of a hierarchical tree structure having a plurality of leaf nodes corresponding to the processors and located at the lowest level of the hierarchical tree, a root node corresponding to a common resource shared by all of the processors and shared memory resources and located at the highest level of the hierarchical tree, and a plurality of intermediate nodes corresponding to the shared memory resources and located in at least one intermediate level of the hierarchical tree; and means for maintaining a frame treasury at each node representing a shared physical memory resource for controlling frame management and allocation of the physical memory of the memory resource, and for identifying the node common to all the nodes with associated treasuries as a high level policy node for allocating frames of physical memory from said frame treasuries for use by at least one of the processors.

20. The operating system as defined in claim 19 and further including a memory manager for receiving a process request for physical memory space, identifying from which node to allocate the requested physical memory space, and for allocating the requested physical memory space from a frame treasury associated with the identified node.

21. The operating system as defined in claim 20, wherein, when the identified node is a policy node, said memory manager allocates the requested physical memory from one or more of the associated frame treasuries associated with the policy node based upon policy constraints of the policy node.

22. A computer-readable medium containing program code embodying an operating system for a multiprocessor system having a hardware architecture including a plurality of processors for executing various active processes, and a plurality of shared memory resources each accessible to each of the processors at an access expense which is different for some of the processors than for other of the processors, the operating system performing a method comprising the steps of:

maintaining an abstraction of the hardware architecture of the multiprocessor system, the abstraction representing the physical arrangement of the processors and the shared memory resources in the form of a hierarchical tree structure having a plurality of leaf nodes corresponding to the processors and located at the lowest level of the hierarchical tree, a root node corresponding to a common resource shared by all of the processors and shared memory resources and located at the highest level of the hierarchical tree, and a plurality of intermediate nodes corresponding to the shared memory resources and located in at least one intermediate level of the hierarchical tree;

maintaining a frame treasury at each node representing a shared physical memory resource for controlling frame management and allocation of the physical memory of the memory resource; and identifying the node common to all the nodes with associated treasuries as a high level policy node for allocating frames of physical memory from said frame treasuries for use by at least one of the processors.

23. An operating system for a multiprocessor system having a hardware architecture including a plurality of processors, and a plurality of shared memory resources each accessible to each of the processors at an access expense which is different for some of the processors than for other of the processors, the operating system comprising:

means for maintaining an abstraction of the hardware architecture of the multiprocessor system, the abstraction representing the physical arrangement of the processors and the shared memory resources in the form of a hierarchical tree structure having a plurality of leaf nodes corresponding to the processors and located at the lowest level of the hierarchical tree, a root node corresponding to a common resource shared by all of the processors and shared memory resources and located at the highest level of the hierarchical tree, and a plurality of intermediate nodes corresponding to the shared memory resources and located in at least one intermediate level of the hierarchical tree; and means for maintaining a high level frame table associated with the root node including a listing of every frame of physical memory that may be allocated and a pointer associated with each listed frame identifying the node representing the memory resource where the frame is located.

24. An operating system for a multiprocessor system having a hardware architecture including a plurality of processors, and a plurality of shared memory resources each accessible to each of the processors at an access expense which is different for some of the processors than for other of the processors, the operating system comprising:

means for maintaining an abstraction of the hardware architecture of the multiprocessor system, the abstraction representing the physical arrangement of the processors and the shared memory resources in the form of a hierarchical tree structure having a plurality of leaf nodes corresponding to the processors and located at the lowest level of the hierarchical tree, a root node corresponding to a common resource shared by all of the processors and shared memory resources and located at the highest level of the hierarchical tree, and a plurality of intermediate nodes corresponding to the shared memory resources and located in at least one intermediate level of the hierarchical tree;

means for maintaining a memory pool at each node representing a memory locale for allocation of virtual memory of the system, said virtual memory being divided into pool units that may be allocated to the memory pools; and means for maintaining a pool unit table, which identifies the availability of pool units and the memory pools to which each of the pool units has been allocated.

25. The operating system as defined in claim 24 and further including a memory manager for receiving process requests for virtual memory space, identifying from which memory pool to allocate the requested virtual memory space, obtaining an additional pool unit from said pool unit table for the identified memory pool if the identified memory pool has insufficient virtual memory space, and for allocating the requested memory space from the identified memory pool.

26. The operating system as defined in claim 25, wherein said memory manager backs the requested virtual memory space with physical memory space associated with the identified memory pool.

27. The operating system as defined in claim 24 and further including a memory manager for releasing virtual memory space, identifying the pool unit to which freed-up virtual memory space belongs, accessing the pool unit table to identify the memory pool to which the identified pool unit belongs, and for releasing the freed-up virtual memory space to the identified memory pool.

28. The operating system as defined in claim 27, wherein said memory manager for looking in each memory pool for contiguous freed-up virtual memory space equal in size to a pool unit, and for releasing the freed-up virtual memory by placing an entry in said pool unit table indicating the pool unit associated with the freed-up virtual memory space is available for allocation to the memory pools.

29. A computer-readable medium containing program code embodying an operating system for a multiprocessor system having a hardware architecture including a plurality of processors for executing various active processes, and a plurality of shared memory resources each accessible to each of the processors at an access expense which is different for some of the processors than for other of the processors, the operating system performing a method comprising the steps of:

maintaining an abstraction of the hardware architecture of the multiprocessor system, the abstraction representing the physical arrangement of the processors and the shared memory resources in the form of a hierarchical tree structure having a plurality of leaf nodes corresponding to the processors and located at the lowest level of the hierarchical tree, a root node corresponding to a common resource shared by all of the processors and shared memory resources and located at the highest level of the hierarchical tree, and a plurality of intermediate nodes corresponding to the shared memory resources and located in at least one intermediate level of the hierarchical tree;

maintaining a memory pool at each node representing a memory locale for allocation of virtual memory of the system, said virtual memory being divided into pool units that may be allocated to the memory pools; and maintaining a pool unit table, which identifies the availability of pool units and the memory pools to which each of the pool units has been allocated.

* * * * *